US012578495B2

(12) United States Patent (10) Patent No.: US 12,578,495 B2

Mori et al. (45) Date of Patent: Mar. 17, 2026

(54) SENSOR BLOCK FOR MAGNETISM MEASUREMENT

(71) Applicant: Aichi Steel Corporation, Tokai (JP)

(72) Inventors: Masaki Mori, Tokai (JP); Michiharu Yamamoto, Tokai (JP); Hiroshi Oishi, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 159 days.

(21) Appl. No.: 18/572,796

(22) PCT Filed: Jun. 21, 2022

(86) PCT No.: PCT/JP2022/024752

§ 371 (c)(1),
(2) Date: Dec. 21, 2023

(87) PCT Pub. No.: WO2022/270508

PCT Pub. Date: Dec. 29, 2022

(65) Prior Publication Data

US 2024/0288601 A1 Aug. 29, 2024

(30) Foreign Application Priority Data

Jun. 25, 2021 (JP) ................................. 2021-105648

(51) Int. Cl.
*G01V 3/10* (2006.01)

(52) U.S. Cl.
CPC ..................................... *G01V 3/10* (2013.01)

(58) Field of Classification Search
CPC .. G01V 3/10; G01R 33/0094; G01R 33/0206; G01R 33/0017; G01R 33/0035;
(Continued)

(56) References Cited

U.S. PATENT DOCUMENTS 4,109,199 A 8/1978 Ball et al.
5,689,185 A 11/1997 Widdershoven et al.
(Continued)

FOREIGN PATENT DOCUMENTS

EP 0696356 B1 1/2004
JP 2002-094140 A 3/2002
(Continued)

OTHER PUBLICATIONS

English translation of JP-2019184473-A (Year: 2019).*
(Continued)

*Primary Examiner* — Huy Q Phan
*Assistant Examiner* — Haidong Zhang
(74) *Attorney, Agent, or Firm* — XSENSUS LLP

(57) ABSTRACT

A magnetism measurement device has a first magnetic sensor that detects magnetism acting along any first direction, a second magnetic sensor that detects magnetism acting along a second direction crossing the first direction in which the first magnetic sensor detects magnetism, and a magnetic field generating part that causes a magnetic field to be generated in response to energization, and the magnetic field generating part is incorporated in a state in which positions opposed to the first magnetic sensor and the second magnetic sensor are fixed, so as to act with magnetism along the first direction and the second direction in response to energization.

18 Claims, 18 Drawing Sheets

(58) Field of Classification Search
CPC .. G01R 15/207; G01R 35/00; G01R 33/0005;
G01R 33/02
See application file for complete search history.

(56) References Cited

U.S. PATENT DOCUMENTS

| | | | | | |
|---|---|---|---|---|---|
| 2002/0143465 | A1* | 10/2002 | Uehara | ................. | G01C 21/28 |
| | | | | | 701/518 |
| 2011/0227569 | A1* | 9/2011 | Cai | ........................ | G01R 33/18 |
| | | | | | 324/252 |
| 2016/0377688 | A1 | 12/2016 | Kleiner et al. | | |
| 2018/0283904 | A1* | 10/2018 | Yamamoto | ............... | G05D 1/02 |
| 2019/0383887 | A1 | 12/2019 | Kleiner et al. | | |
| 2021/0025959 | A1 | 1/2021 | Yamamoto et al. | | |

FOREIGN PATENT DOCUMENTS

| | | | | | |
|---|---|---|---|---|---|
| JP | 2006-208020 | A | 8/2006 | | |
| JP | 2008-180550 | A | 8/2008 | | |
| JP | 2016-194531 | A | 11/2016 | | |
| JP | 2017-183189 | A | 10/2017 | | |
| JP | 2019184473 | A | * 10/2019 | ......... | G01R 33/0035 |
| JP | 2020-113287 | A | 7/2020 | | |

OTHER PUBLICATIONS

International Search Report and Written Opinion mailed on Sep. 6,
2022, received for PCT Application PCT/JP2022/024752, filed on
Jun. 21, 2022, 9 pages including English Translation.

* cited by examiner

FIG. 10

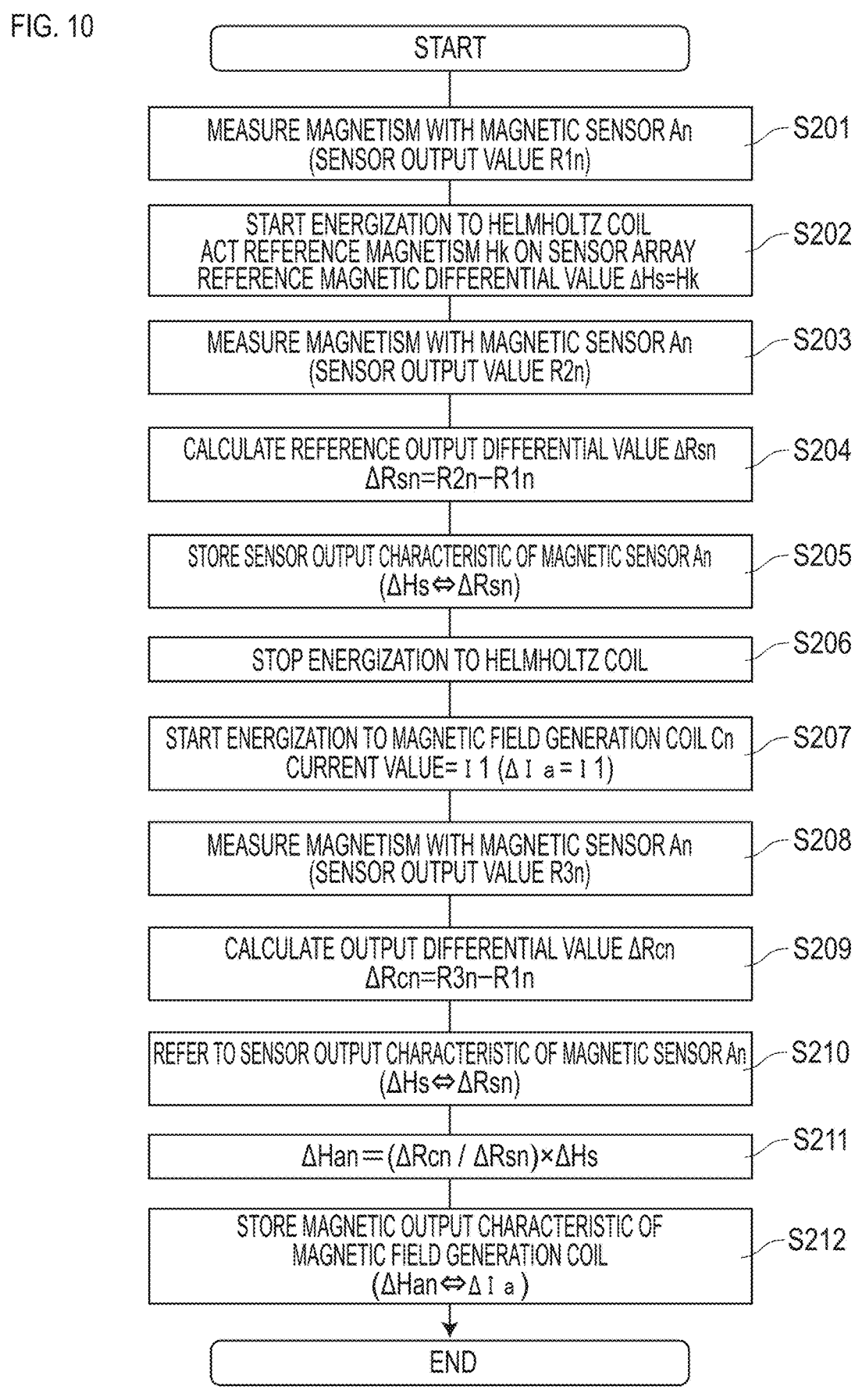

START

MEASURE MAGNETISM WITH MAGNETIC SENSOR An
(SENSOR OUTPUT VALUE R1n) — S201

START ENERGIZATION TO HELMHOLTZ COIL
ACT REFERENCE MAGNETISM Hk ON SENSOR ARRAY
REFERENCE MAGNETIC DIFFERENTIAL VALUE $\Delta Hs = Hk$ — S202

MEASURE MAGNETISM WITH MAGNETIC SENSOR An
(SENSOR OUTPUT VALUE R2n) — S203

CALCULATE REFERENCE OUTPUT DIFFERENTIAL VALUE $\Delta Rsn$
$\Delta Rsn = R2n - R1n$ — S204

STORE SENSOR OUTPUT CHARACTERISTIC OF MAGNETIC SENSOR An
($\Delta Hs \Leftrightarrow \Delta Rsn$) — S205

STOP ENERGIZATION TO HELMHOLTZ COIL — S206

START ENERGIZATION TO MAGNETIC FIELD GENERATION COIL Cn
CURRENT VALUE $= I1$ ($\Delta Ia = I1$) — S207

MEASURE MAGNETISM WITH MAGNETIC SENSOR An
(SENSOR OUTPUT VALUE R3n) — S208

CALCULATE OUTPUT DIFFERENTIAL VALUE $\Delta Rcn$
$\Delta Rcn = R3n - R1n$ — S209

REFER TO SENSOR OUTPUT CHARACTERISTIC OF MAGNETIC SENSOR An
($\Delta Hs \Leftrightarrow \Delta Rsn$) — S210

$\Delta Han = (\Delta Rcn / \Delta Rsn) \times \Delta Hs$ — S211

STORE MAGNETIC OUTPUT CHARACTERISTIC OF
MAGNETIC FIELD GENERATION COIL
($\Delta Han \Leftrightarrow \Delta Ia$) — S212

END (a)

( b )

SENSOR BLOCK FOR MAGNETISM MEASUREMENT

CROSS-REFERENCE TO RELATED APPLICATIONS

The present application is based on PCT filing PCT/JP2022/024752, filed Jun. 21, 2022, which claims priority from Japanese Patent Application No. 2021-105648, filed Jun. 25, 2021, the entire contents of each are incorporated herein by reference.

TECHNICAL FIELD

The present invention relates to a magnetism measurement device including a magnetic sensor for measuring magnetism.

BACKGROUND ART

Conventionally, a method of detecting a magnetic marker laid in or on a road by using a plurality of magnetic sensors attached to a vehicle has been suggested (for example, refer to Patent Literature 1 below). In this method, by calculating a difference between the magnetic measurement values of two or more magnetic sensors among the plurality of magnetic sensors, the influence of external disturbance magnetism is suppressed, thereby trying to enhance accuracy in detecting a magnetic marker. When a difference between the magnetic measurement values of two or more magnetic sensors is calculated, an error in the magnetic measurement values due to variations in characteristics of the magnetic sensors is amplified by difference calculation and can become a large error.

To address this, a magnetism measurement device with a function of calibrating a magnetic sensor incorporated therein has been suggested (for example, refer to Patent Literature 2 below). A magnetic sensor included in this magnetism measurement device is a MI (Magneto Impedance) sensor with a detection coil arranged as externally inserted with respect to an amorphous wire forming a magneto-sensitive body. In this magnetic field measurement device, a magnetic field generation coil is disposed in series with respect to the detection coil. With the use of the magnetic field generation coil, it is possible to calibrate the magnetic sensor as occasion arises even during operation of the magnetic field measurement device.

CITATION LIST

Patent Literatures

Patent Literature 1: Japanese Unexamined Patent Application Publication No. 2017-083189
Patent Literature 2: Japanese Unexamined Patent Application Publication No. 2016-194531

SUMMARY OF INVENTION

Technical Problem

However, the above-described conventional magnetism measurement device has the following problem. That is, when the magnetism measurement device requires a plurality of magnetism detecting directions, it is required to provide a magnetic field generation coil for each magnetism detecting direction to induce an increase in cost. Moreover, when a plurality of magnetic field generation coils are provided, variations in magnetic output characteristics of the magnetic field generation coils can pose a problem.

The present invention was made in view of the above-described conventional problem, and is to provide a magnetism measurement device having a plurality of magnetism detecting directions, the magnetism measurement device that is capable of easy calibration and is advantageous in cost.

Solution to Problem

The present invention resides in a magnetism measurement device having:
  a first magnetic sensor that detects magnetism acting along a first direction;
  a second magnetic sensor that detects magnetism acting along a second direction crossing the first direction in which the first magnetic sensor detects the magnetism; and
  a magnetic field generating part that causes a magnetic field to be generated in response to energization,
  wherein the magnetic field generating part is incorporated in a state in which positions of the magnetic field generating part relative to the first magnetic sensor and the second magnetic sensor are fixed, so as to act with the magnetism along the first direction and the second direction in response to the energization.

Advantageous Effects of Invention

The magnetism measurement device of the present invention includes the magnetic field generating part, in addition to the first and second magnetic sensors with directions of detecting magnetism cross each other. This magnetic field generating part can act with the magnetism along both directions of the direction in which the first magnetic sensor detects magnetism and the direction in which the second magnetic sensor detects magnetism in response to the energization. This magnetic field generating part can be shared for use in calibration of the first magnetic sensor and the second magnetic sensor.

According to the magnetism measurement device of the present invention, it is possible to calibrate the first and second magnetic sensors by sharing the magnetic field generating part. In this magnetism measurement device, it is not required to provide the magnetic field generating part for calibration to each of the first and second magnetic sensors, which is advantageous in cost. Also, in the magnetism measurement device of the present invention, the magnetic field generating part is shared for use between the first magnetic sensor and the second magnetic sensor, this does not pose a problem due to variations in magnetic output characteristics of the magnetic field generating part for calibration of the first magnetic sensor and the magnetic field generating part for calibration of the second magnetic sensor.

BRIEF DESCRIPTION OF DRAWINGS

FIG. 10 is a flow diagram depicting a flow of process under maintenance mode in the first embodiment.

DESCRIPTION OF EMBODIMENTS

Embodiments of the present invention are specifically described by using the following embodiments.

First Embodiment

The present embodiment is an example regarding marker detection device 1 for detecting magnetic marker 10 laid on a road. Details of this are described by using FIG. 1 to FIG. 13.

Figure 1:
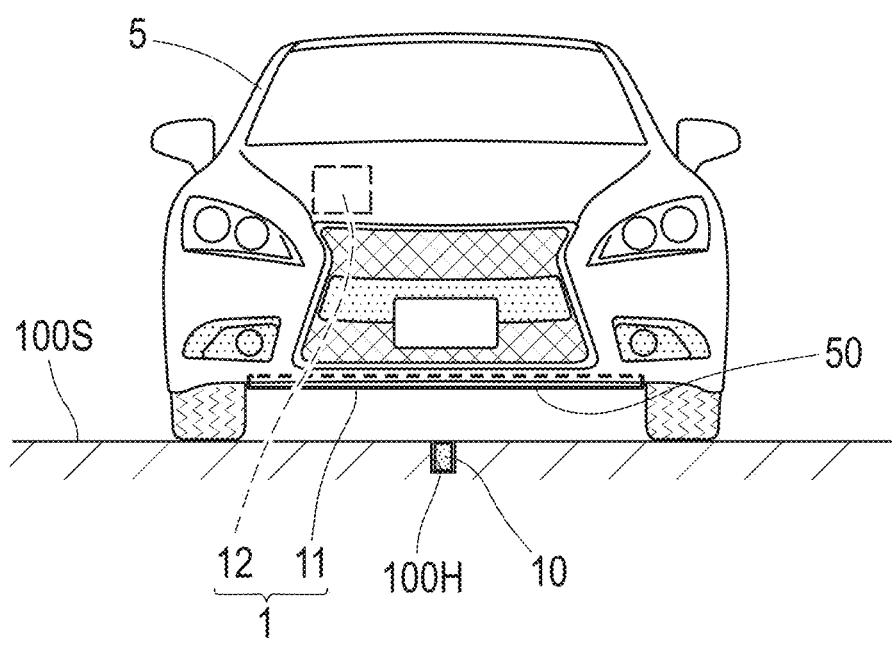
FIG. 1 is a front view of a vehicle attached to a sensor array in a first embodiment.
Figure 2:
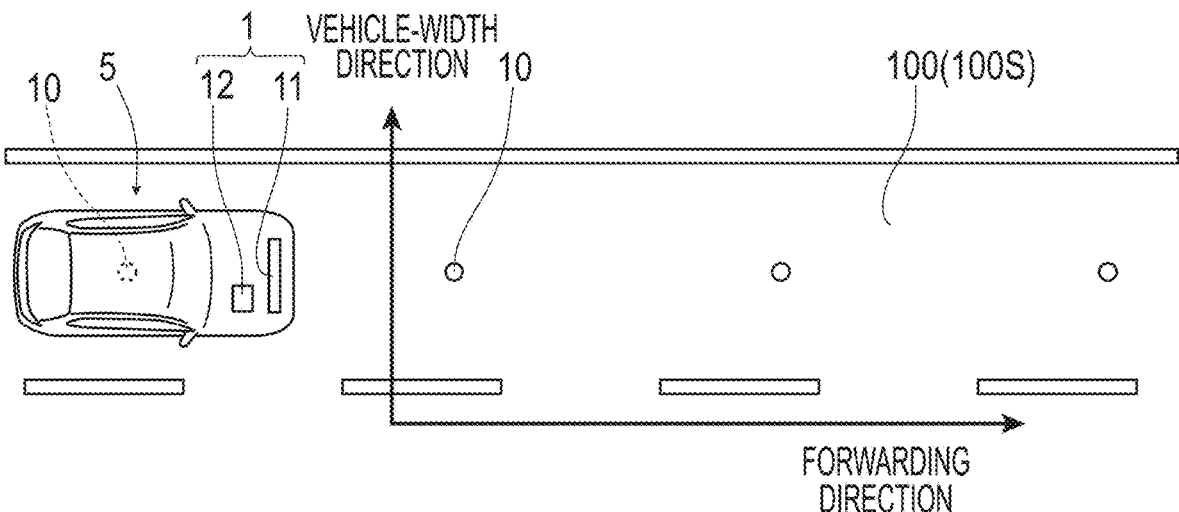
FIG. 2 is a bird's-eye view depicting the vehicle on a lane where magnetic markers were laid in the first embodiment.

Marker detection device 1 is, as in FIG. 1 and FIG. 2, a vehicle onboard device incorporated in vehicle 5 to detect magnetic marker 10 laid on a road, forming one example of a magnetism measurement device. Magnetic markers 10 are, for example, laid on road surface 100S so as to be along the center of lane 100 where vehicle 5 travels. This magnetic marker 10 forms, for example, a columnar shape having a diameter of 20 mm and a height of 28 mm, and is buried as accommodated in accommodation hole 100H provided to be bored in road surface 100S.

(1) Configuration of Marker Detection Device

Marker detection device 1 is, as in FIG. 1 and FIG. 2, a device in which sensor array 11 where a plurality of magnetic sensors are arrayed and detecting unit 12 having incorporated therein a CPU (central processing unit) and so forth not depicted are combined.

Sensor array 11 is a rod-shaped unit where a plurality of magnetic sensors arrayed on a straight line. Sensor array 11 is attached to vehicle floor 50 corresponding to the bottom surface of vehicle 5. In the case of vehicle 5 of the present embodiment, the attachment height with reference to road surface 100S is approximately 200 mm. In sensor array 11, magnetic sensors for detecting magnetism in a forwarding direction and magnetic sensors for detecting magnetism in a vehicle-width direction are incorporated.

Detecting unit 12 is a unit that detects magnetic marker 10 by processing sensor signals outputted from sensor array 11. The detection result from detecting unit 12 is inputted to, for example, ECU or the like not depicted on a vehicle 5 side, for use in various controls, such as automatic steering control and lane departure warning, for vehicle 5 to travel as keeping lane 100. The configurations of detecting unit 12 and sensor array 11 are sequentially described below.

(1.1) Configuration of Detecting Unit

Detecting unit 12 (FIG. 3) is a unit including an electronic substrate (omitted in the drawings) with having mounted thereon a CPU which performs various arithmetic operations, as well as memory elements such as a ROM and a RAM, and so forth. Detecting unit 12 includes a marker detection circuit for detecting magnetic marker 10 and a lateral shift amount measurement circuit for measuring a lateral shift amount of vehicle 5 with respect to detected magnetic marker 10.

(1.2) Configuration of Sensor Array

Figure 3:
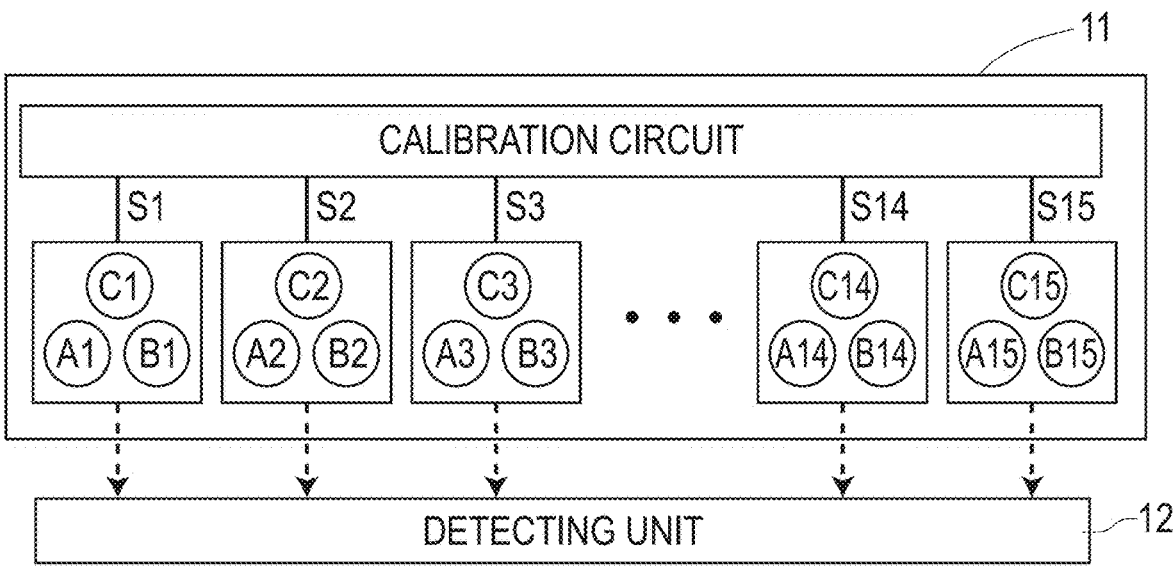
FIG. 3 is a block diagram depicting the configuration of a sensor array in the first embodiment.

In sensor array 11, as in FIG. 3, sensor blocks Sn (n is an integer from 1 to 15) each having magnetic sensors An and Bn incorporated therein are arrayed on a straight line. Sensor array 11 is attached along the vehicle-width side so that sensor block S1 is positioned on a left side of vehicle 5 (passenger-seat side of a right-hand vehicle) and the sensor blocks are sequentially aligned toward a right side. The space between sensor blocks Sn in sensor array 11 is set at 10 cm. Sensor array 11 is configured to include fifteen sensor blocks Sn as well as calibration circuit 110. Each sensor block Sn is an electronic component having two magnetic sensors An and Bn in one set and magnetic field generation coil Cn incorporated to form one chip. Each sensor block Sn can be regarded also as a magnetic sensor having magnetic sensors An and Bn incorporated therein. In this case, magnetic sensors An and Bn may be regarded as sensor elements.

Sensor array 11 includes output ports of fifteen channels so as to be able to simultaneously output sensor signals of each sensor block Sn. The sensor signal is a signal indicating a magnetic measurement value of magnetic sensor An and a magnetic measurement value of magnetic sensor Bn. Sensor array 11 performs magnetism measurement in response to a control signal by detecting unit 12 and inputs the sensor signal to detecting unit 12. Note that although details will be described further below, detecting unit 12 inputs the control signal to sensor array 11 every time it acquires a pulse signal outputted from vehicle 5 side in accordance with rotation of wheels. The pulse signal is outputted every time the wheel rotates by an angle equivalent to a distance of, for example, 30 mm.

In sensor array 11, with fifteen sensor blocks Sn arranged on the straight line, a mode is achieved in which fifteen magnetic sensors An and fifteen magnetic sensors Bn are respectively arrayed on the straight line. Also, by adopting sensor block Sn having magnetic field generation coil Cn incorporated therein, a mode is achieved in which magnetic field generation coil Cn is individually provided to magnetic sensors An and Bn. In each sensor block Sn, pulse circuits 22, signal processing circuits 24, and so forth described further below are incorporated as electronic circuits. Two systems of the electronic circuits such as pulse circuits 22 and signal processing circuits 24 are provided so as to be able to support magnetic sensors An and Bn. Note that one system of the electronic circuits may be provided and the electronic circuits may be shared between magnetic sensor An and magnetic sensor Bn in a time-division manner.

One of two magnetic sensors An and Bn in one set (FIG. 3) forms one example of a first magnetic sensor that detects magnetism acting along any first direction, and the other forms one example of a second magnetic sensor that detects magnetism acting along a second direction crossing the first direction in which the first magnetic sensor detects magnetism. Magnetic sensors An and Bn of the present embodiment can measure magnetic components acting along directions orthogonal to each other. Each sensor block Sn is incorporated in sensor array 11 so that, in a vehicle onboard state of sensor array 11, magnetic sensor An measures a magnetic component acting along the forwarding direction, and magnetic sensor Bn measures a magnetic component acting along the vehicle-width direction. The forwarding direction and the vehicle-width direction is one example of the above-described first direction or second direction.

Figure 4:
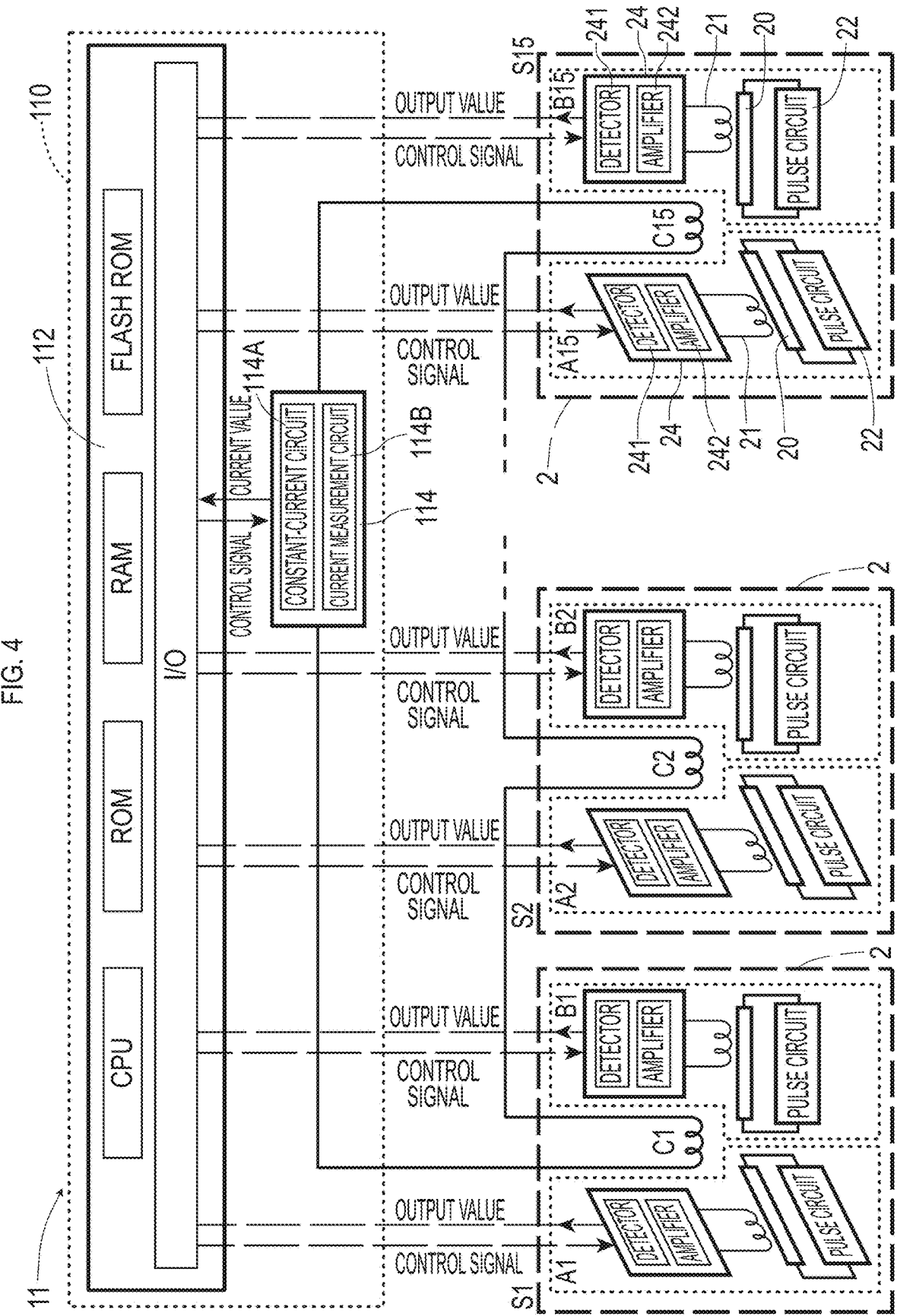
FIG. 4 is a block diagram depicting the configurations of a magnetic sensor and a calibration circuit in the first embodiment.

Each of magnetic sensors An and Bn of each sensor block Sn is, as in FIG. 4, a magnetic sensor configured by using a MI (Magneto-Impedance) element including amorphous wire (magnetic wire) 20 made of a CoFeSiB-based alloy with almost zero magnetostriction and pickup coil (coil) 21 wound around the periphery of this amorphous wire 20.

Each of magnetic sensors An and Bn is a highly-sensitive magnetic having a measurement range of magnetic flux density of ±0.6 milliteslas and a magnetic flux resolution within the measurement range of 0.02 microteslas. This high sensitivity is achieved by the MI effect, in which the impedance of amorphous wire 20 sensitively changes in response to the external magnetic field.

The MI element measures a voltage occurring to pickup coil 21 when amorphous wire 20 is energized with a pulse current, thereby detecting magnetism acting on amorphous wire 20. This MI element has detection sensitivity in the axial direction (longitudinal direction) of amorphous wire 20 as a magneto-sensitive body.

In sensor array 11 of the present embodiment, the axial direction of amorphous wire 20 in magnetic sensor An and, the axial direction of amorphous wire 20 in magnetic sensor Bn have an orthogonal relation. And, sensor array 11 of the present embodiment is assembled to vehicle 5 so that amorphous wire 20 of each magnetic sensor An is along the forwarding direction and amorphous wire 20 of each magnetic sensor Bn is along the vehicle-width direction.

Each of pulse circuits 22 (FIG. 4) incorporated in sensor block Sn is a circuit that generates a pulse signal as a source of the pulse current with which amorphous wire 20 is energized. Signal processing circuit 24 (FIG. 4) is a circuit that takes out an induced voltage of pickup coil 21 by using detector (synchronous detector) 241 that opens and closes in conjunction with the pulse signal and amplifies that induced voltage using amplifier 242. Signal processing circuit 24 takes the induced voltage after amplification as a magnetic measurement value of the magnetic sensor. Amplifier 242 has an amplification factor adjustable by control by calibration circuit 110.

Magnetic field generation coil Cn (FIG. 3) is a tubular coil with an electric wire wound around so as to be able to generate a magnetic field in response to energization, forming one example of a magnetic field generating part. Magnetic field generation coils Cn incorporated in respective sensor blocks Sn are connected so as to form a mutually electrical series. Magnetic field generation coil Cn generates the magnetic field in response to energization by calibration circuit 110 to act on magnetic sensors An and Bn with magnetism. This magnetic field generation coil Cn is used to calibrate magnetic sensors An and Bn. Since magnetic field generation coil Cn, which is the coil with the electric wire wound around, has a characteristic in which linearity of the quantity of magnetism with respect to the magnitude of an energization current is high, it is suitable for calibration of magnetic sensors An and Bn.

Figure 5:
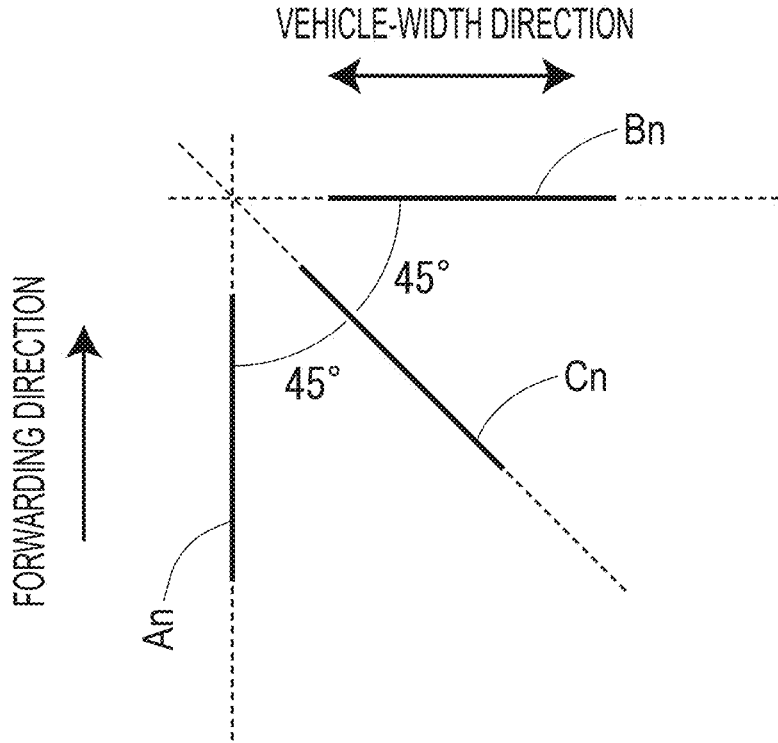
FIG. 5 is a descriptive diagram of a positional relation between the magnetic sensor and a magnetic field generation coil in the first embodiment.

Magnetic field generation coil Cn is, as in FIG. 5, incorporated in a state in which its position related to magnetic sensors An and Bn is fixed. Note that in the drawing, magnetic sensors An and Bn are each expressed by a line segment schematically representing a magneto-sensitive body, and magnetic field generation coil Cn is expressed by a line segment representing a center axis. The detecting directions of magnetic sensors An and Bn each reside in its corresponding line-segment direction. The detecting axes of magnetic sensors An and Bn each match its corresponding line segment. The tube direction of magnetic field generation coil Cn with the electric wire wound around so as to form a tubular shape resides in a direction of the line segment representing the center axis.

Tubular magnetic field generation coil Cn is, as in FIG. 5, incorporated so that its tube direction crosses the vehicle-width direction and the forwarding direction at an angle of 45 degrees. Here, the tube direction of magnetic field generation coil Cn means a direction of the center axis of the coil forming a tubular shape. In the following, the axis along the tube direction of magnetic field generation coil Cn is referred to as a center axis of magnetic field generation coil Cn. According to magnetic field generation coil Cn crossing the vehicle-width direction at an angle of 45 degrees and also crossing the forwarding direction at an angle of 45 degrees as described above, it is possible to act on both of magnetic sensors An and Bn with magnetism in response to energization. Furthermore, in the configuration of the present embodiment, the position relation of magnetic field generation coil Cn related to magnetic sensor An and the position relation of magnetic field generation coil Cn related to magnetic sensor Bn almost identical. Therefore, according to magnetic field generation coil Cn, it is possible to almost uniformly act on magnetic sensor An and magnetic sensor Bn with magnetism.

Magnetic field generation coil Cn of each sensor block Sn has common design specifications, and also has common incorporation specifications, which are specifications about a relative position relation with magnetic sensors An and Bn. Furthermore, as described above, each magnetic field generation coil Cn is disposed so as uniformly act on its corresponding magnetic sensors An and Bn with magnetism. Also, since magnetic field generation coils Cn of respective sensor blocks Sn are connected in series as described above, the current supplied from calibration circuit 110 is passed to each magnetic field generation coil Cn equally for energization.

Therefore, in terms of design, magnetic field generation coil Cn of each sensor block Sn can equally generate magnetism and, furthermore, can equally act on its corresponding magnetic sensors An and Bn with magnetism. However, variations in magnetic output characteristic of respective magnetic field generation coils Cn are inevitable, and variations in the position relation between magnetic sensors An and Bn due to assembling error of magnetic field generation coil Cn in each sensor block Sn and so forth are also inevitable. Thus, variations in the amount of magnetism with which each magnetic field generation coil Cn acts on its corresponding magnetic sensor An and magnetic sensor Bn are inevitable.

Calibration circuit 110 (FIG. 4) described above is configured to include coil driving circuit 114 that performs energization to magnetic field generation coil Cn, and so forth and calibrating circuit 112 that performs a process of calibrating magnetic sensors An and Bn of each sensor block Sn, and so forth. Calibrating circuit 112 forming one example of a calibrating part is configured to include CPU, ROM (read only memory), RAM (random access memory), flash ROM, I/O, and so forth.

Calibrating circuit 112 has a function as a storage part that stores characteristic information (magnetic output characteristic) of each magnetic field generation coil Cn, an estimating part that calculates estimated measurement values, which are estimated values of magnetic measurement values of magnetic sensors An and Bn, and so forth. The characteristic information of each magnetic field generation coil Cn stored in the storage part is used for the estimating part to calculate an estimated measurement value.

Coil driving circuit 114 is configured to include constant-current circuit 114A that supplies a current to magnetic field generation coil Cn and current measurement circuit 114B that measures a current value of the supplied current. Constant-current circuit 114A supplies the current to magnetic field generation coil Cn in accordance with control by calibration circuit 110. The current measurement circuit 114B inputs a measured current value of magnetic field generation coil Cn to calibrating circuit 112.

Figure 6:
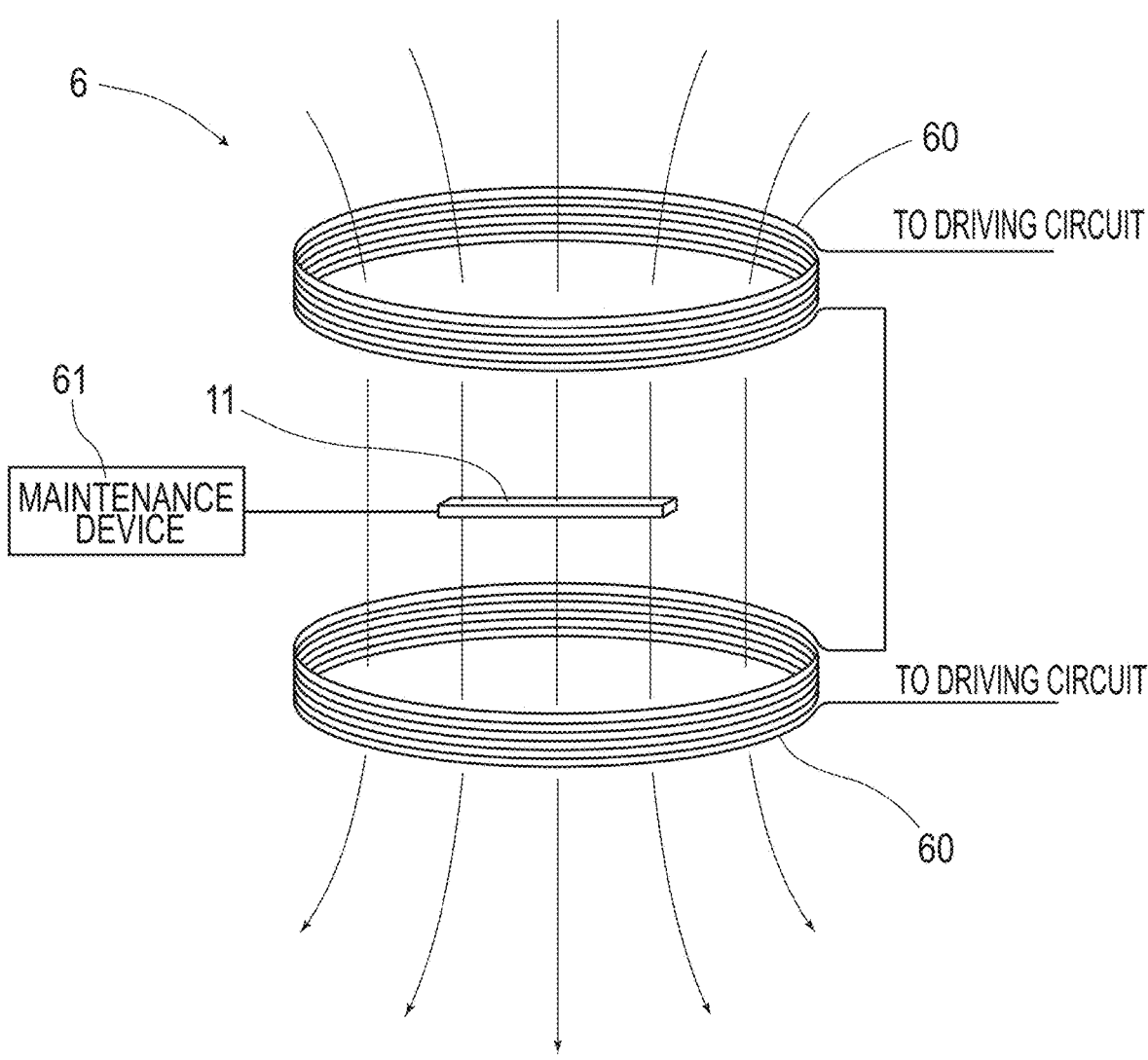
FIG. 6 is a descriptive diagram of a device for performing a process under maintenance mode in the first embodiment.

With a program read from the ROM being processed by the CPU, calibrating circuit 112 can perform at least two types of operation mode. As operation modes, there are normal mode to be performed during the use period of vehicle 5 and maintenance mode at the time of factory shipping or at the time of maintenance. Switching to maintenance mode is performed by, for example, control by externally-connected maintenance device 61 (FIG. 6).

Normal mode is an operation mode for calibrating magnetic sensors An and Bn of each sensor block Sn during the use period of vehicle 5. Maintenance mode is an operation mode for identifying a magnetic output characteristic (characteristic information) of each magnetic field generation coil Cn by using reference magnetism of Helmholtz coil 60 (refer to FIG. 6). The characteristic information (described further below) of each magnetic field generation coil Cn identified by this maintenance mode is stored by the storage part of calibration circuit 110 (calibrating circuit 112) described above for use in calibration of magnetic sensors An and Bn. Note that details of each operation mode will be described later with reference to flow diagrams of FIG. 10, FIG. 11, and so forth.

Here, the configuration of a device for performing the process under maintenance mode is described with reference to FIG. 6. The device for performing the process under maintenance mode is configured to include maintenance device 61 dedicated to performing power supply, switching operation mode, and so forth, magnetic field generation device 6 that generates a uniform magnetic field, and so forth. Magnetic field generation device 6 is, for example, a magnetic device including Helmholtz coil 60.

Helmholtz coil 60 is a coil system including two circular coils with common specifications coaxially arranged as spaced, with a space between the two circular coils being equal to the radius of the coil. In Helmholtz coil 60, with equal currents in the same orientation being passed to the two circular coils for energization, a highly-uniform magnetic field can be generated. Magnetism generated by Helmholtz coil 60 can be used as reference magnetism of a reference quantity of magnetism. Note that a Maxwell coil may be used, in which a large-diameter coil is coaxially arranged on an outer circumferential side of Helmholtz coil 60 to further enhance uniformity of the magnetic field.

Maintenance device 61 is a device that controls both of sensor array 11 and magnetic field generation device 6 when the process under maintenance mode is performed. The maintenance device 61 can supply operating power to sensor array 11, and can also intervene in transmission and reception of status information indicating an operation status between sensor array 11 and magnetic field generation device 6. As status information, for example, there are information indicating a standby state, in which preparation for energization from magnetic field generation device 6 to Helmholtz coil 60 has been completed, and so forth.

(2) Operation of Marker Detection Device

Next, as operation of marker detection device 1, (2.1) operation of detecting magnetic marker 10 is generally described, and then details of (2.2) operation of calibrating sensor block Sn are described. Note that, as described above, the operation of calibrating sensor block Sn includes (2.2.1) process under maintenance mode and (2.2.2) process under normal mode.

(2.1) Magnetic Marker Detecting Operation

Figure 7:
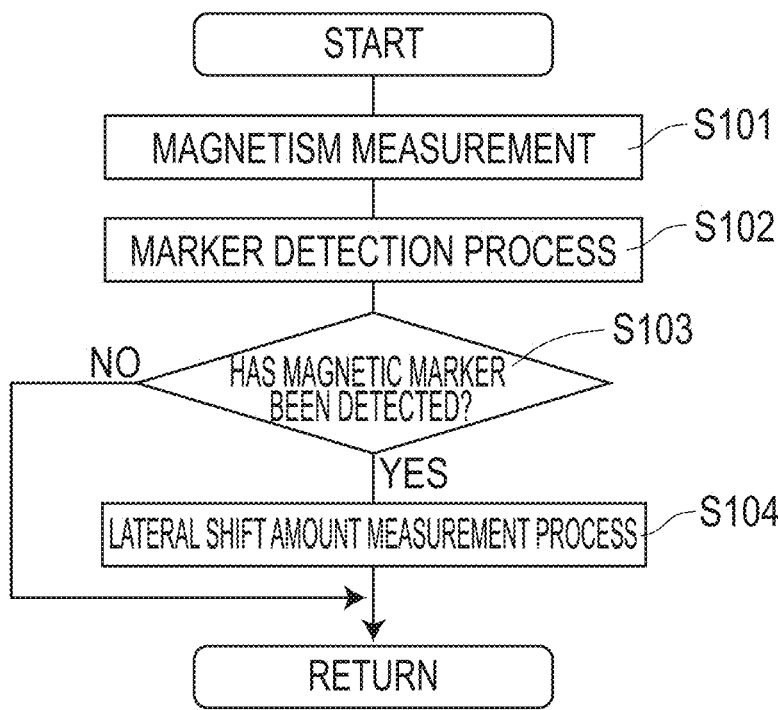
FIG. 7 is a flow diagram depicting a flow of process of detecting a magnetic marker in the first embodiment.
Figure 8:
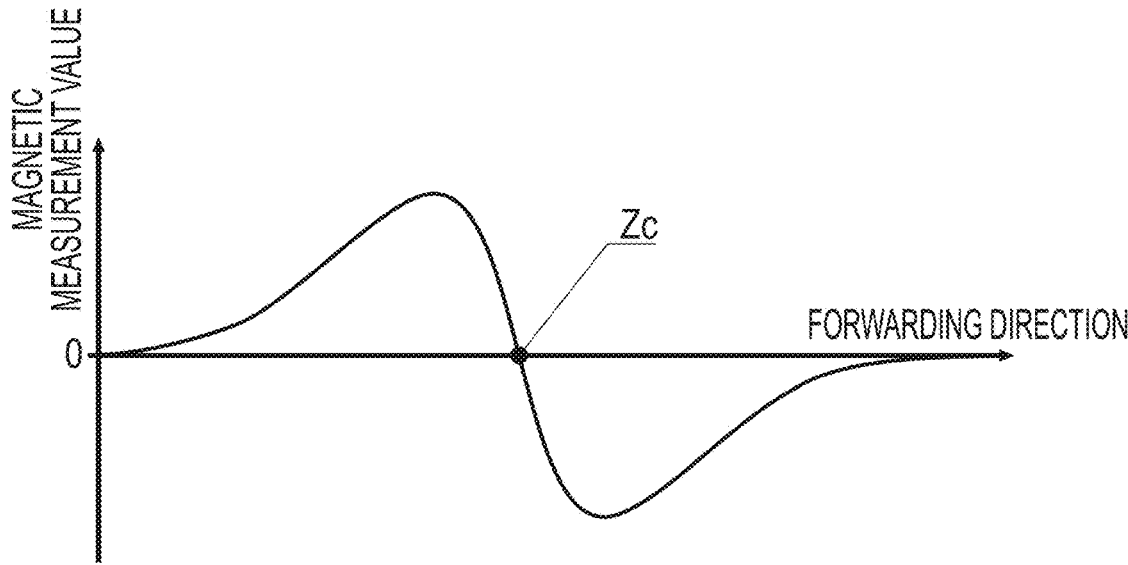
FIG. 8 is a graph depicting temporal changes of magnetic measurement values (total sum) of magnetic sensors An at the time of passage over a magnetic marker in the first embodiment.

As in FIG. 7, detecting unit 12 outputs the control signal by taking the pulse signal outputted from vehicle 5 side every time, for example, the vehicle proceeds 30 mm, to cause sensor array 11 to perform magnetic measurement (S101). As described above, when magnetic measurement is performed, sensor array 11 inputs a sensor signal of each channel (fifteen channels with n=1 to 15) to detecting unit 12. The sensor signal includes the magnetic measurement value of magnetic sensor An and the magnetic measurement value of magnetic sensor Bn.

Detecting unit 12 stores, as occasion arises, the sensor signal of each sensor block Sn in a memory buffer not depicted in the drawing. The sensor signals of respective sensor blocks Sn are stored sequentially from the temporally oldest one, over a previous predetermined time period. As described above, the sensor signal of each sensor block Sn is a signal indicating a magnetic measurement value of magnetic sensor An and a magnetic measurement value of magnetic sensor Bn. In the memory buffer, time-series data of the magnetic measurement values of magnetic sensors An and Bn are generated.

Detecting unit (marker detection circuit) 12 performs marker detection process by using the time-series data of the magnetic measurement values of magnetic sensor An, which are measurement values of magnetic components in the forwarding direction (S102). For example, when magnetic sensor An moves along the forwarding direction of vehicle 5 to pass directly above magnetic marker 10, as in FIG. 8, the magnetic measurement value in the forwarding direction changes so that its sign is reversed before and after magnetic marker 10 and the magnetic measurement value crosses zero at a position directly above magnetic marker 10.

During traveling of vehicle 5, when the sign of the total sum of magnetic measurement values in the forwarding direction detected by each magnetic sensor An of sensor blocks Sn is reversed, that is, when zero-cross Zc occurs, it can be determined that sensor array 11 is positioned directly above magnetic marker 10. When sensor array 11 is positioned directly above magnetic marker 10 and zero-cross Zc of the magnetic measurement values in the forwarding direction occurs as described above, detecting unit 12 determines that it has detected magnetic marker 10.

When detecting unit 12 determines that it has detected magnetic marker 10 (S103: YES), it performs process of measuring a lateral shift amount of vehicle 5 with respect to that magnetic marker 10 (S104). Detecting unit (lateral shift amount measurement circuit) 12 reads the magnetic measurement value of magnetic sensor Bn of each sensor block Sn at the time point when sensor array 11 is positioned directly above magnetic marker 10, that is, at the time point of zero-cross Zc in FIG. 9, and performs the process of measuring a lateral shift amount. As described above, the magnetic measurement value of magnetic sensor Bn is a measurement value of a magnetic component acting in the vehicle-width direction. The magnetic measurement values of magnetic sensors Bn of respective sensor blocks Sn form a data string indicating a distribution in the vehicle-width direction of the magnetic measurement values in the vehicle-width direction.

Here, for example, for a magnetic sensor with the same specifications as those of magnetic sensor Bn that measures a magnetic component along the vehicle-width direction, a movement along a virtual line in the vehicle-width direction passing directly above magnetic marker 10 is assumed. In this case, the magnetic measurement value in the vehicle-width direction by this magnetic sensor changes so that its sign is reversed on both sides interposing magnetic marker 10 therebetween and the magnetic measurement value crosses zero at a position directly above magnetic marker 10. Therefore, in sensor array 11 where fifteen sensor blocks Sn are arrayed in the vehicle-width direction, the sign of the magnetic measurement value in the vehicle-width direction detected by magnetic sensor Bn varies depending on the side where the magnetic sensor is located with respect to magnetic marker 10.

Figure 9:
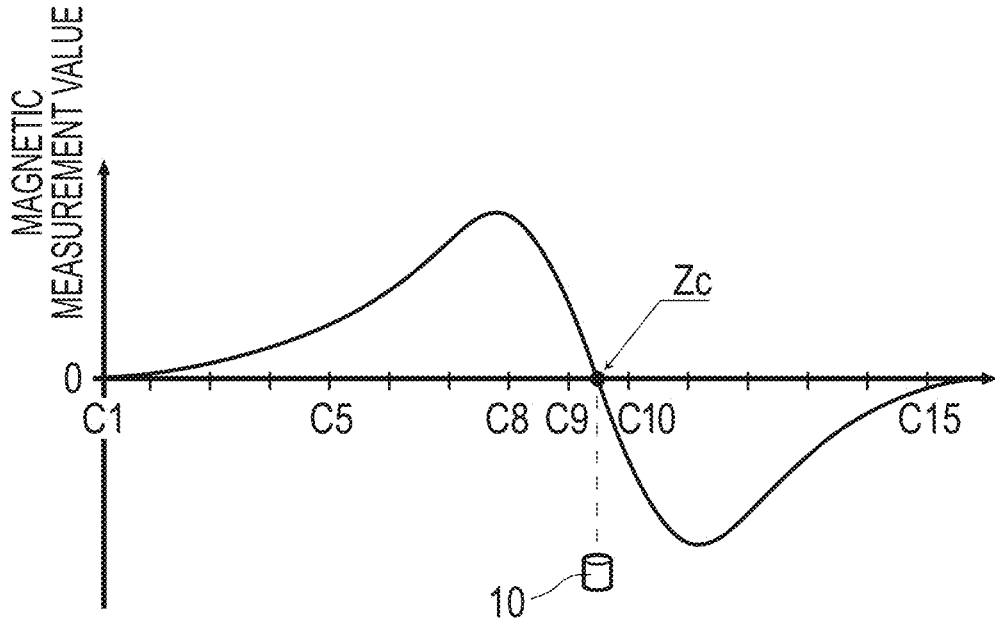
FIG. 9 is a graph depicting a change curve of magnetic measurement values of magnetic sensors Bn when the sensor array is positioned directly above the magnetic marker in the first embodiment.

In a change curve of FIG. 9 exemplarily depicting a data string of magnetic measurement values (magnetic measurement values in the vehicle-width direction) of magnetic sensor Bn of each sensor block Sn, zero-cross Zc where the sign of the magnetic measurement value in the vehicle-width direction is reversed appears so as to correspond to the position of magnetic marker 10. The position of zero-cross Zc in the drawing matches the position of magnetic marker 10 in the vehicle-width direction. The position of magnetic marker 10 in the vehicle-width direction can be identified as a position corresponding to zero-cross Zc.

Detecting unit (lateral shift amount measurement circuit) 12 measures a deviation of vehicle 5 in the vehicle-width direction with respect to magnetic marker 10 as the lateral shift amount. In the present embodiment, the position of sensor block S8 at the center of sensor array 11, that is, the center of vehicle 5 in the vehicle-width direction, is set as a representative point. For example, in the case of FIG. 9, the position of zero-cross Zc corresponding to magnetic marker 10 is a position corresponding to S9.5 at an approximately intermediate point between S9 and S10. Since the space between sensor blocks S9 and S10 is 10 cm as described above, the lateral shift amount of the representative point (sensor block S8) of vehicle 5 with respect to magnetic marker 10 is (9.5−8)×10=15 cm.

(2.2) Sensor Block Calibrating Operation

As described above, as process to be performed by calibration circuit 110 (FIG. 3) to calibrate magnetic sensors An and Bn of each sensor block Sn of sensor array 11, there are (2.2.1) a process under maintenance mode at the time of factory shipping or at the time of maintenance work and (2.2.2) a process under normal mode, which is an operation mode to be performed during a vehicle use period.

Here, as described above, magnetic field generation coil Cn in each sensor block Sn of sensor array 11 of the present embodiment is incorporated so as to generate a magnetic field including magnetic components in the detecting direction (forwarding direction) of magnetic sensor An and magnetic components in the detecting direction (vehicle-width direction) of magnetic sensor Bn. In sensor array 11, it is possible to calibrate magnetic sensors An and Bn by using magnetic field generation coil Cn of each sensor block Sn. Details of the process under maintenance mode and the process under normal mode described below are processes common to both magnetic sensor An and magnetic sensor Bn. Thus, in the following description, details of the calibration method are described by taking magnetic sensor An as an example. Also for magnetic sensor Bn, it is possible to calibrate the magnetic characteristic by similar process under maintenance mode and process under normal mode.

(2.2.1) Process Under Maintenance Mode

The process under maintenance mode is a process for identifying a magnetic output characteristic (characteristic information) of magnetic field generation coil Cn (FIG. 3, FIG. 4) by using reference magnetism of Helmholtz coil 60 (FIG. 6). Since magnetic field generation coil Cn (FIG. 3, FIG. 4) has high linearity between the current value and the quantity of magnetism, if the magnetic output characteristic is identified, the quantity of magnetism acting on magnetic sensor An can be quantitatively controlled or estimated. For example, if it is grasped, as the magnetic output characteristic of magnetic field generation coil Cn, that quantity of magnetism H acts on the magnetic sensor when a current with certain current value I is passed for energization, it is estimated that passing a current with a current value of $0.5I$ is to magnetic field generation coil Cn for energization causes a quantity of magnetism of $0.5H$ to act on that magnetic sensor.

The process under maintenance mode is performed by using magnetic field generation device 6 that generates a uniform magnetic field, maintenance device 61, or the like (refer to FIG. 6). The process under maintenance mode is performed in a state in which sensor array 11 is retained in a space where magnetic field generation device 6 uniformly forms a magnetic field (the state exemplarily depicted in FIG. 6). Here, sensor array 11 is preferably retained so that the magnetism detecting direction of magnetic sensor An as a calibration target is along the uniform magnetic field. Upon acquiring status information indicating a standby state in which preparation for energization from magnetic field generation device 6 to Helmholtz coil 60 has been completed, maintenance device 61 transfers that status information to sensor array 11.

When the status information of magnetic field generation device 6 indicating the standby state is received, calibration circuit 110 of sensor array 11 causes each magnetic sensor An to perform magnetism measurement, and acquires sensor output value R1$n$ when magnetism by Helmholtz coil 60 does not act (FIG. 10, S201). Calibration circuit 110 stores sensor output value $R1n$ as a sensor output of each magnetic sensor An in a non-energization state of Helmholtz coil 60 and magnetic field generation coil Cn. This sensor output value $R1n$ often does not become zero due to external magnetism of nature, offset of the sensor output value, or the like.

Upon receiving from sensor array 11 the status information indicating completion of magnetism measurement, magnetic field generation device 6 starts energization to Helmholtz coil 60 (S202). Magnetic field generation device 6 controls the energization current of Helmholtz coil 60 so as to cause reference magnetism Hk, which is a reference quantity of magnetism, to act on each magnetic sensor An of sensor array 11.

The magnetic field generated by Helmholtz coil 60 acts on each magnetic sensor An as a bias magnetic field to be superposed on the external magnetic field. Therefore, when reference magnetism Hk of Helmholtz coil 60 acts on each magnetic sensor An, the quantity of magnetism acting on magnetic sensor An changes by reference magnetism Hk. That is, reference magnetic differential value $\Delta Hs$, which is a change quantity of magnetism acting on each magnetic sensor An when energization to Helmholtz coil 60 starts, becomes $\Delta Hs=Hk$. After the state becomes such that reference magnetism Hk is caused to act on each magnetic sensor An, magnetic field generation device 6 transmits status information indicating that energization is going on to calibration circuit 110 via maintenance device 61.

Upon receiving from magnetic field generation device 6 the status information indicating that energization is going on, calibration circuit 110 causes each magnetic sensor An to perform magnetism measurement, thereby acquiring sensor output value $R2n$ (S203). Furthermore, maintenance device 61 calculates, for each magnetic sensor An, reference output differential value $\Delta Rsn$ ($=R2n-R1n$), which is a change amount of a sensor output of magnetic sensor An when energization to Helmholtz coil 60 starts (S204, sensor characteristic acquiring step).

Calibration circuit 110 stores, for each magnetic sensor An, a numerical combination ($\Delta Hs \Leftrightarrow \Delta Rsn$) of reference magnetic differential value $\Delta Hs$ (common for each magnetic sensor An) stored at step S202 above and reference output differential value $\Delta Rsn$ calculated at step S204 as a sensor output characteristic, which is characteristic information of each magnetic sensor An (S205, sensor characteristic acquiring step). This combination represents a sensor output characteristic in which the output differential value of magnetic sensor An is $\Delta Rsn$ when the quantity of magnetism acting on magnetic sensor An changes by $\Delta Hs$.

Upon receiving from sensor array 11 status information indicating that storage of the sensor output characteristics (characteristic information) of all magnetic sensors An has been completed, magnetic field generation device 6 (FIG. 6) stops energization to Helmholtz coil 60 (FIG. 6) (S206). Upon receiving status information indicating that energization to Helmholtz coil 60 has been stopped, sensor array 11 starts energization to magnetic field generation coil Cn (S207).

As current value I1 to be passed to magnetic field generation coil Cn for energization, it is preferable to set a current value that can act on magnetic sensor An with a quantity of magnetism close to reference magnetism Hk by Helmholtz coil 60 based on the design specifications such as the number of winding and the coil diameter of the magnetic field generation coil Cn. When the energization to magnetic field generation coil Cn is switched from a current value of zero to current value I1, a current differential value, which is a change amount of the current value for energization of magnetic field generation coil Cn, becomes $\Delta Ia=I1$. Note that since the magnetic field generation coils Cn are connected so as to form a series, current differential value $\Delta Ia$ is common for each magnetic field generation coil Cn. On the other hand, since the magnetic output characteristic varies among respective magnetic field generation coils Cn, the quantity of magnetism with which each magnetic field generation coil Cn acts on magnetic sensor An is not constant, and variations occur.

Calibration circuit 110 performs magnetism measurement by each magnetic sensor An during a period in which current value I1 is passed to each magnetic field generation coil Cn for energization, and acquires sensor output value $R3n$ of each magnetic sensor An (S208, magnetism measuring step). Then, calibration circuit 110 performs, for each magnetic sensor An, a calculation of subtracting sensor output value $R1n$ (sensor output value at S201 described above) when magnetism from magnetic field generation coil Cn and Helmholtz coil 60 does not act from sensor output value $R3n$ when magnetism of magnetic field generation coil Cn acts. With this, output differential value $\Delta Rcn$ ($=R3n-R1n$), which is a change amount of the sensor output of magnetic sensor An in accordance with current differential value $\Delta Ia$ is acquired for each magnetic sensor An (S209, magnetism measuring step). Current differential value $\Delta Ia$ is a change amount of the energization current to magnetic field generation coil Cn.

To estimate magnetic differential value $\Delta Han$ corresponding to output differential value $\Delta Rcn$ of each magnetic sensor An, calibration circuit 110 first refers to the sensor output characteristic ($\Delta Hs \Leftrightarrow \Delta Rsn$) of magnetic sensor An stored at step S205 described above (S210, magnetic output characteristic acquiring step). Then, by proportional calculation based on the sensor output characteristic of magnetic sensor An in which output differential value $\Delta Rsn$ occurs due to magnetic differential value $\Delta Hs$, magnetic differential value $\Delta Han$ ($=(\Delta Rcn/\Delta Rsn) \times \Delta Hs$) corresponding to output differential value $\Delta Rcn$ (S209 described above) of each magnetic sensor An is calculated (S211, magnetic output characteristic acquiring step). Then, as magnetic output characteristic of magnetic field generation coil Cn, calibration circuit 110 stores magnetic differential value $\Delta Han$ and current differential value $\Delta Ia$ in association with each other, thereby storing a numerical combination of both (S212, magnetic output characteristic acquiring step).

In the process under maintenance mode performed in the procedure as described above, by measuring reference magnetism Hk of Helmholtz coil 60 using magnetic sensor An, it is possible to grasp the sensor output characteristic of each magnetic sensor An (sensor characteristic acquiring step). Furthermore, by measuring magnetism with which magnetic field generation coil Cn acts by using each magnetic sensor An whose sensor output characteristic has been grasped (magnetism measuring step), it is possible to grasp the magnetic output characteristic of the magnetic field generation coil Cn (magnetic output characteristic acquiring step).

In general, magnetic field generation coil Cn with an electric wire wound therearound has high linearity in the magnitude of magnetism with respect to the magnitude of the current to be passed for energization, and the quantity of magnetism changes substantially in proportion to the current value of the energization current. Therefore, according to magnetic field generation coil Cn whose magnetic output characteristic has been grasped, the quantity of magnetism acting on corresponding magnetic sensor An can be quantitatively controlled, which is helpful in calibration of magnetic sensor An.

(2.2.2) Process Under Normal Mode

As with the above-described process under maintenance mode, details of the process under normal mode are described by taking magnetic sensor An as an example. For magnetic sensor Bn, the process under normal mode is possible in a similar manner.

During the use period of vehicle 5, various magnetisms act on each magnetic sensor An from outside and inside of vehicle 5. In particular, in vehicle 5, various electronic components that can be magnetism generation sources are installed. The magnetisms of these electronic components may act on magnetic sensor An, and the quantity of that magnetisms may become larger than the quantity of magnetism acting from magnetic marker 10. Moreover, since structures in an RC structure such as a tunnel or bridge configuring a road can be large magnetism generation sources, the magnitude of external magnetism acting on vehicle 5 from outside fluctuates in accordance with the traveling environment.

In general, the sensitivity of the magnetic sensor, that is, the ratio of change amount $\Delta R$ of the sensor output value when the acting quantity of magnetism changes by $\Delta H$, can be handled as constant if $\Delta H$ is small. On the other hand, when the degree of the absolute value of the quantity of magnetism of a measurement target fluctuates, that is, the degree of a fluctuation range of the quantity of magnetism fluctuates, the sensitivity of magnetic sensor An may greatly change. Furthermore, the degree of fluctuations in sensitivity like this varies for each magnetic sensor An due to individual difference. Thus, in the use period of vehicle 5, if the fluctuation range of the quantity of magnetism acting on each magnetic sensor An is shifted, there is a high possibility that variations in sensitivity of each magnetic sensor An proceed.

The process under normal mode by calibration circuit 110 is performed to enhance uniformity in sensitivity of each magnetic sensor An in the use period of vehicle 5. This process under normal mode is suitable in a situation in which magnetism acts on each magnetic sensor An of sensor array 11 from outside almost uniformly.

It is quite possible to perform the process under normal mode even, for example, in a situation in which magnetism derived from a relatively small magnetism generation source such as magnetic marker 10, a manhole or the like, or an end portion or the like of a large magnetism generation source such as a bridge in an RC structure acting on sensor array 11, that is, in a situation in which magnetism acting on sensor array 11 changes in accordance with the movement of the vehicle. As described above, the process under normal mode is a process using output differential value $\Delta Rcn$ of magnetic sensor An in accordance with a change in current to be passed to magnetic field generation coil Cn for energization. For example, when a change in current acts on magnetic sensor An, if switching is made between energization/non-energization in short cycles, a change in magnetism acting on sensor array 11 in accordance with the movement of the vehicle is subtle, and the accuracy of output differential value $\Delta Rcn$ is not greatly impaired. Thus, the process under normal mode can be performed with high accuracy even in the situation in which magnetism by magnetic marker 10 or the like acts on sensor array 11.

Figure 11:
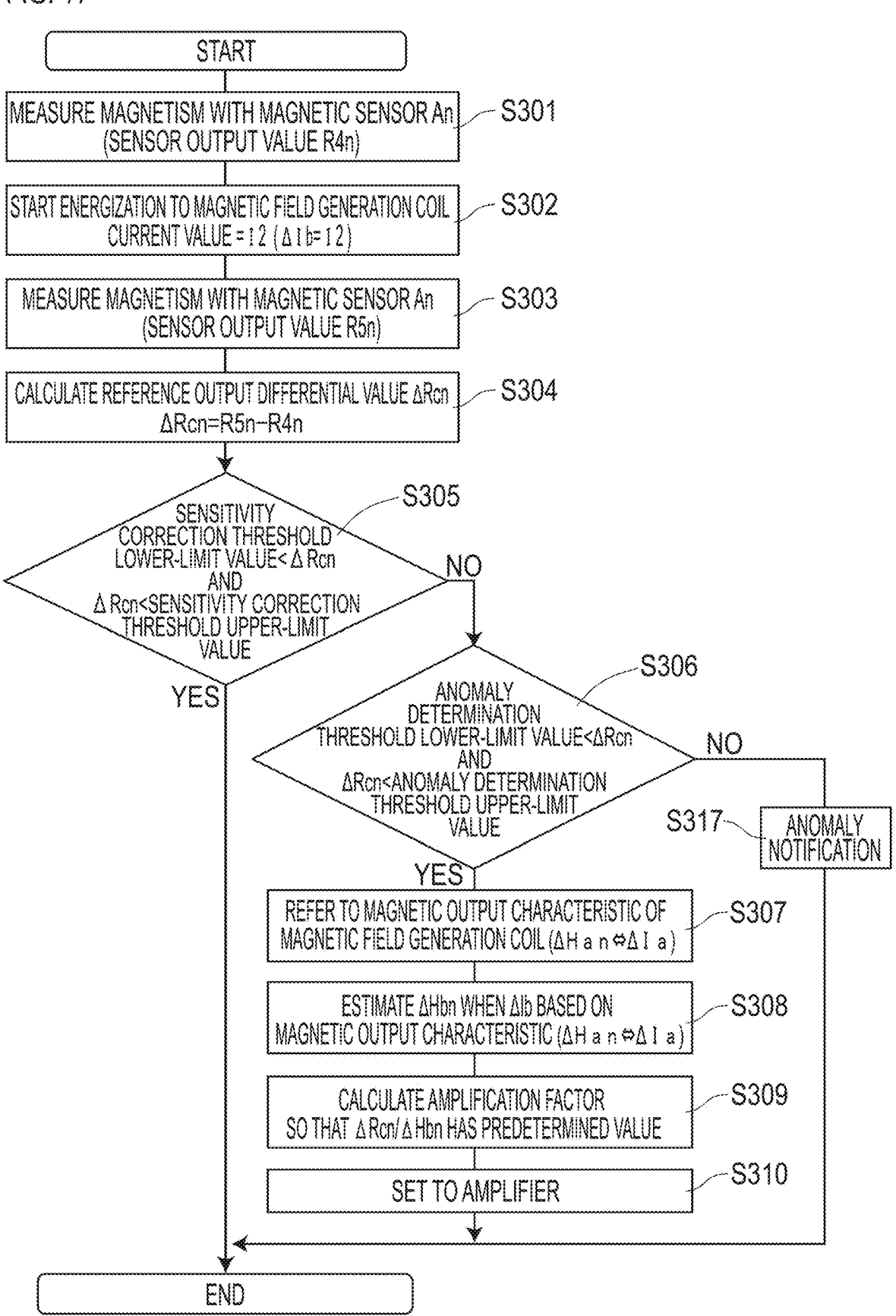
FIG. 11 is a flow diagram depicting a flow of process under normal mode in the first embodiment.

As in FIG. 11, first, in a state of non-energization to magnetic field generation coil Cn, calibration circuit 110 measures magnetism almost uniformly acting from outside on each magnetic sensor An, and sequentially store sensor output values R4n of each magnetic sensor An (S301). Subsequently, calibration circuit 110 starts energization to magnetic field generation coil Cn (S302). As current value I2 at this time, current value I1 may be set, which is the same as that at step S207 described above under maintenance mode, or a different current value may be set. In the present embodiment, current value I2, which is the same as current value I1, is passed to each magnetic field generation coil Cn for energization. Thus, current differential value, which is a change amount of the current passed to each magnetic field generation coil Cn for energization, is $\Delta Ib=I2=I1$.

Calibration circuit 110 causes each magnetic sensor An to perform magnetism measurement during energization to each magnetic field generation coil Cn to acquire sensor output value R5n (S303). Then, output differential value $\Delta Rcn$ ($=R5n-R4n$) of each magnetic sensor An in accordance with a change in current by current differential value $\Delta Ib$ at the time of start of energization to magnetic field generation coil Cn is calculated by arithmetic operation (S304).

Calibration circuit 110 performs threshold process for determining whether output differential value $\Delta Rcn$ calculated at step S304 described above belongs to a range of sensitivity correction threshold values set in advance (S305). When output differential value $\Delta Rcn$ is larger than a sensitivity correction threshold value lower-limit value and smaller than a sensitivity correction threshold value upper-limit value, that is, output differential value $\Delta Rcn$ belongs to the above-described range of sensitivity correction threshold values (S305: YES), calibration circuit 110 determines that the process for calibrating each magnetic sensor An is not required, and does not perform this process and bypasses the process.

On the other hand, when output differential value $\Delta Rcn$ is equal to or smaller than the sensitivity correction threshold value lower-limit value or equal to or larger than the sensitivity correction threshold value upper-limit value, that is, output differential value $\Delta Rcn$ is out of the above-described range of sensitivity correction threshold values (S305: NO), calibration circuit 110 further performs threshold process for determining whether output differential value $\Delta Rcn$ belongs to a range of anomaly determination threshold values set in advance (S306). When output differential value $\Delta Rcn$ is equal to or smaller than an anomaly determination threshold value lower-limit value or equal to or larger than an anomaly determination threshold value upper-limit value, that is, output differential value $\Delta Rcn$ is out of the above-described range of anomaly determination threshold values (S306: NO), calibration circuit 110 does not perform the process for calibrating each magnetic sensor An, and notifies detecting unit 12 of an anomaly (S317).

When the output differential value $\Delta Rcn$ is larger than the anomaly determination threshold value lower-limit value and smaller than the anomaly determination threshold value upper-limit value, that is, output differential value $\Delta Rcn$ belongs to the above-described range of anomaly determination threshold values (S306: YES), calibration circuit 110 performs the process at step S307 to S310 for calibrating each magnetic sensor An. To calibrate each magnetic sensor An, calibration circuit 110 first refers to the magnetic output characteristic ($\Delta Han \Leftrightarrow \Delta Ia$) of the magnetic field generation coil Cn stored at step S212 described above under maintenance mode (S307). Then, by using this magnetic output characteristic, magnetic differential value $\Delta Hbn$ is estimated, which is a change in the quantity of magnetism acting on each magnetic sensor An caused by current differential value ΔIb when current value I2 is passed to current magnetic field generation coil Cn for energization at step S302 (S308, magnetism estimating step).

A method of estimating this magnetic differential value ΔHbn assumes that the magnetic differential value changes almost linearly with respect to the current differential value and that a proportional relation between ΔHan and ΔIa in the magnetic output characteristic (ΔHan⇔ΔIa) referred to at step S307 is retained even if the external environment changes. Magnetic differential value ΔHbn when current differential value ΔIb acts on magnetic field generation coil Cn can be estimated by an arithmetic expression ΔHbn= (ΔIb/ΔIa)×ΔHan. In the present embodiment, since current differential value ΔIa=ΔIb, magnetic differential value ΔHbn is equal to ΔHan.

Calibration circuit 110 calculates an amplification factor of output differential value ΔRcn so that a ratio between output differential value ΔRcn of magnetic sensor An calculated at step S304 and magnetic differential value ΔHbn estimated at step S308 has a predetermined value (S309, calibrating step). Then, calibration circuit 110 calibrates each magnetic sensor An by setting the amplification factor of each magnetic sensor An, calculated by arithmetic operation, to corresponding amplifier 242 (S310, calibrating step).

Here, the predetermined value at step S309 described above indicates sensitivity of magnetic sensor An with respect to magnetic differential value ΔHbn. Therefore, if step S309 described above is performed for each magnetic sensor An, the sensitivities of all magnetic sensor An can be made almost uniform. Details of this are described with reference to FIG. 12 and FIG. 13 exemplarily depicting sensor output characteristics of any two magnetic sensors Aα and Bβ (α and β are different natural numbers in 1 to 15) of magnetic sensors An. The lateral axis in the drawings represents quantity of magnetism H acting on the magnetic sensor, and the longitudinal axis represents sensor output value R of the magnetic sensor.

Figure 12:
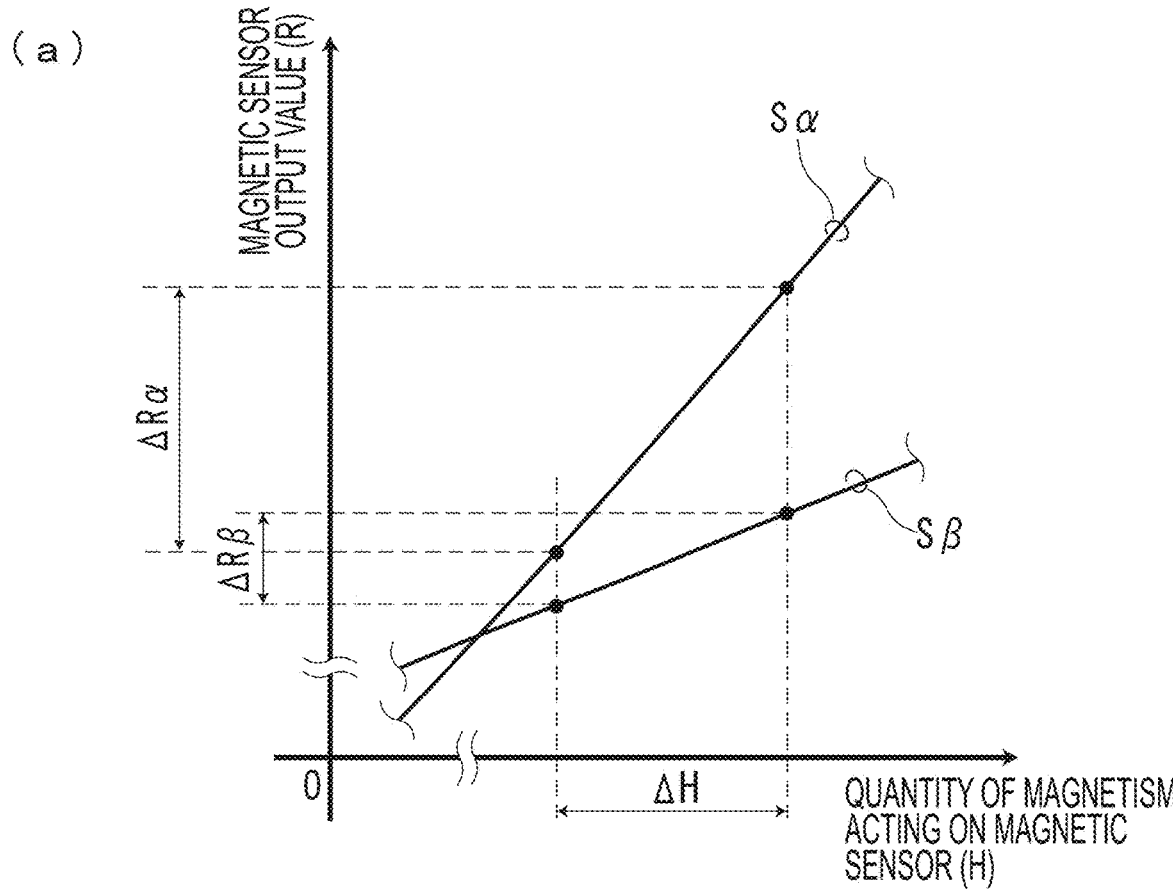
FIG. 12 is a descriptive diagram of magnetic sensor calibration process in the first embodiment (sensor output characteristic of the magnetic sensor before calibration).
Figure 13:
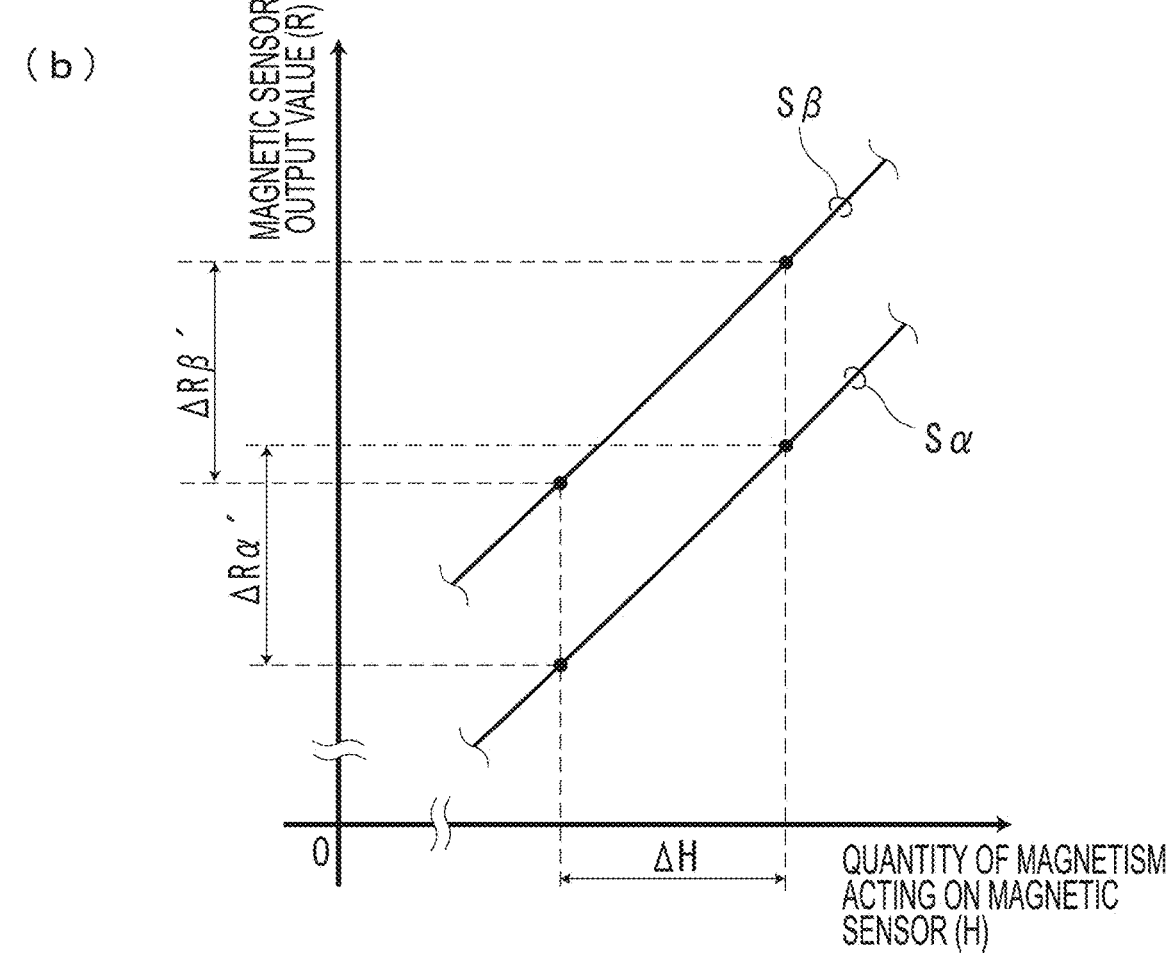
FIG. 13 is a descriptive diagram of magnetic sensor calibration process in the first embodiment (sensor output characteristic of the magnetic sensor after calibration).

For example, when the acting quantity of magnetism changes by ΔH (that is, when the magnetic differential value is ΔH), if there is a difference in sensitivity between any two magnetic sensors Aα and Aβ, a difference occurs between output differential values ΔRα and ΔRβ, which are change amounts of output values, as in FIG. 12. By performing step S309 and S310 described above for individually setting the amplification factor for each of magnetic sensors Aα and Aβ, it is possible to make change amount ΔRα' and change amount ΔRβ' corresponding to respective magnetic sensors Aα and Aβ equal to each other, as in FIG. 13.

Note that calibration circuit 110 repeats the above-described process under normal mode, for example, when the fluctuation range of the quantity of magnetism acting on magnetic sensor An is shifted due to fluctuations in the magnitude of external magnetism or when a regular calibration period comes, and performs calibration of magnetic sensor An as occasion arises. According to the method of operating marker detection device 1 described above including the process of calibrating magnetic sensor An, even if a change in magnetic environment, a change with time, an environmental change in temperature, humidity, or the like, or another change occurs, an error in the time differential value for each magnetic sensor An can be avoided, and high detection accuracy can be maintained. Also, since the vehicle is not required to be brought into a maintenance factory or the like for every maintenance including calibration of magnetic sensor An, effort, expense, and others on a vehicle user's side can be reduced. As for the degree of the fluctuation range of the quantity of magnetism, a threshold value may be set.

While the method of calibrating magnetic sensor An has been described above, magnetic sensor Bn can also be calibrated by a similar method. In this manner, marker detection device 1 of the present embodiment (one example of a magnetism measurement device) is a device having a function of calibrating magnetic sensors An and Bn. In each magnetic sensor block Sn of sensor array 11 of the present embodiment, magnetic field generation coil Cn capable of acting on magnetic sensor An and Bn with magnetism is incorporated. By using this magnetic field generation coil Cn, it is possible to calibrate magnetic sensors An and Bn in normal use state (normal mode) of sensor array 11. Thus, sensor array 11 of the present embodiment can maintain favorable sensor characteristics by magnetic sensors An and Bn in the vehicle use period over a long time. According to sensor array 11 with favorable sensor characteristics of magnetic sensors An and Bn, it is possible to detect magnetic marker 10 with high certainty while suppressing erroneous detection.

In the present embodiment, magnetic field generation coil Cn is exemplarily described as a magnetic field generating part. However, the magnetic field generating part may be any that generates a magnetic field in response to energization, a simple electric wire may be used. Also, in the present embodiment, the configuration is exemplarily described in which sensor array 11 and detecting unit 12 are separate bodies. However, detecting unit 12 may be incorporated and integrated in sensor array 11.

Furthermore, in the present embodiment, magnetic field generation coil Cn is arranged so that the center axis divides an angle of 90 degrees at which the detecting direction of magnetic sensor An and the detecting direction of magnetic sensor Bn are orthogonal to each other, the center axis is positioned along a radial direction in this angle range of 90. In place of this, the magnetic field generation coil Cn may be arranged so that the center axis is positioned along the radial direction outside the angle range of 90 described above.

In the configuration of the present embodiment, the configuration is adopted in which respective magnetic field generation coils Cn are electrically connected in series. When magnetic field generation coils Cn are connected in series, an equal current can be simultaneously passed to each magnetic field generation coil Cn for energization, and each of magnetic sensors An and Bn can be efficiently calibrated.

Note in the present embodiment that magnetic field generation coil Cn is disposed so that the center axis belongs to a plane defined by the detection axis of magnetic sensor An (center axis of a magneto-sensitive body, axis along the detecting direction) and the detection axis of magnetic sensor Bn (refer to FIG. 5). It is not an imperative requirement that the center axis of magnetic field generation coil Cn belong to this plane. Magnetic field generation coil Cn may be disposed so that the center axis is parallel to this plane. That is, with respect to the detection axis of magnetic sensor An and the detection axis of magnetic sensor Bn, the center axis of magnetic field generation coil Cn may be arranged in a twisted positional relationship. It is only required that the tube direction of magnetic field generation coil Cn cross the detecting direction of magnetic sensor An and the detecting direction of magnetic sensor Bn. Also, magnetic field generation coil Cn may be such that the center axis of magnetic field generation coil Cn is inclined with respect to the plane defined by the detection axis of magnetic sensor An and the detection axis of magnetic sensor Bn, that is, the center axis is oblique with respect to the plane.

For example, an expression in which the detecting direction of magnetic sensor An crosses the tube direction forming the axial direction of the center axis of magnetic field generation coil Cn is an expression including a case in which the center axis of the magneto-sensitive body corresponding to the detecting direction of magnetic sensor An and the center axis of magnetic field generation coil Cn are in a twisted positional relationship. Also, for example, an expression in which the detecting direction of magnetic sensor An crosses the tube direction forming the axial direction of the center axis of magnetic field generation coil Cn as forming the right angle is an expression including the case in which the center axis of the magneto-sensitive body corresponding to the detecting direction of magnetic sensor An and the center axis of magnetic field generation coil Cn are in a twisted positional relationship as forming the right angle.

In the present embodiment, magnetic field generation coil Cn is disposed so that its center axis equally divides the right angle formed by the detection axis of magnetic sensor An and the detection axis of magnetic field generation coil Bn (the center axes may have a twisted positional relationship). It is not an imperative requirement that the center axis of magnetic field generation coil Cn equally divide the right angle at which the detection axes of magnetic sensors An and Bn cross and, for example, the center axis may not equally divide the right angle, for example, 30 degrees and 60 degrees. Also, in the present embodiment, magnetic sensor An and magnetic sensor Bn with their detection axes orthogonal to each other are exemplarily described. The angle at which the detection axis of magnetic sensor An and the detection axis of magnetic sensor Bn cross is not limited to the right angle. Furthermore, it is not an imperative requirement that the detection axis of magnetic sensor An and the detection axis of magnetic sensor Bn are included in one plane, and the detection axes may have a twisted positional relationship. It is also not an imperative requirement that magnetism of magnetic field generation coil Cn uniformly acts on magnetic sensor An and magnetic sensor Bn.

In the process under maintenance mode, a calibration process of making sensitivities of the respective magnetic sensors uniform by using reference magnetism Hk with which Helmholtz coil 60 acts on each magnetic sensor may be performed. In this calibration process, the amplification factor of each amplifier 242 is set so that the output differential value, which is a change amount of the sensor output outputted by the magnetic sensor, is uniform with respect to magnetic differential value $\Delta Hs$ with which Helmholtz coil 60 acts on each magnetic sensor. In this case, at step S205 in FIG. 10, the sensor output characteristic after this calibration process is preferably stored.

As for the characteristic information indicating the sensor output characteristic of the magnetic sensor, information of the combination of the magnetic differential value acting on the magnetic sensor and the output differential value, which is a change amount of the sensor output outputted by the magnetic sensor, is exemplarily described. As the characteristic information of the magnetic sensor, a combination of the quantity of magnetism acting on the magnetic sensor and the sensor output value outputted by the magnetic sensor may be used, or a ratio of the sensor output value with respect to the acting quantity of magnetism may be used. The characteristic information is only required to be information indicating a relation between magnetism acting on the magnetic sensor and the sensor output by the magnetic sensor.

In the present embodiment, as one example of the first magnetic sensor and the second magnetic sensor, magnetic sensor An and magnetic sensor Bn are exemplarily described, and the magnetism measurement device (marker detection device 1) including a plurality of combinations of the first magnetic sensor and the second magnetic sensor is exemplarily described. The magnetism measurement device may include only one set of the combination of the first magnetic sensor and the second magnetic sensor.

Second Embodiment

Figure 14:
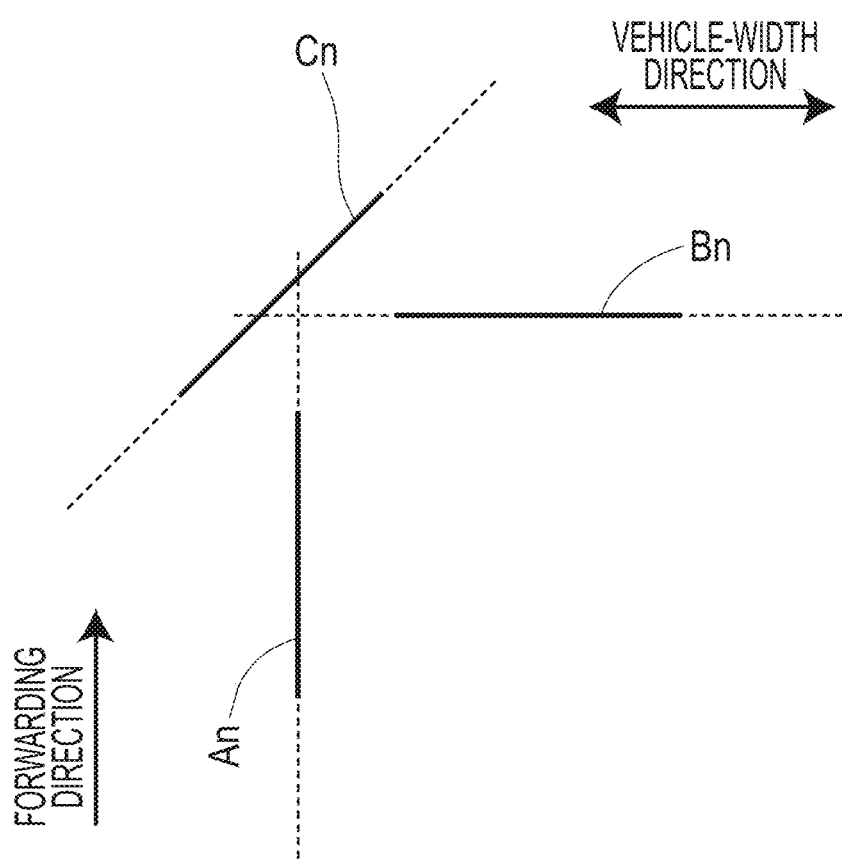
FIG. 14 is a descriptive diagram of another position relation between the magnetic sensor and the magnetic field generation coil in a second embodiment.
Figure 15:
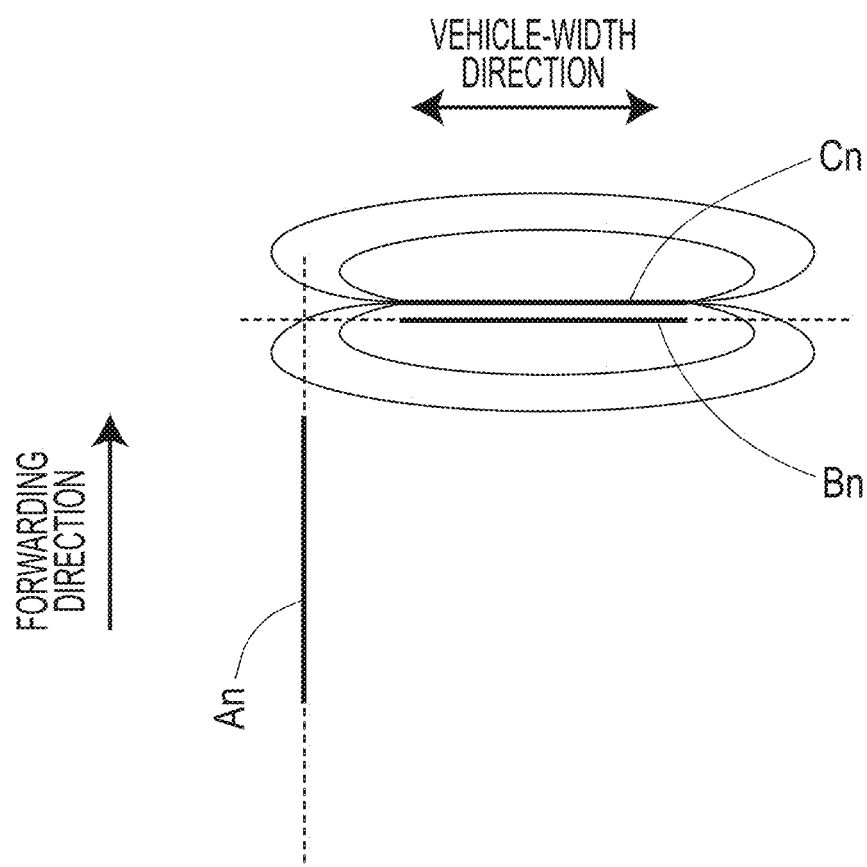
FIG. 15 is a descriptive diagram of another positional relation between the magnetic sensor and the magnetic field generation coil in the second embodiment.
Figure 16:
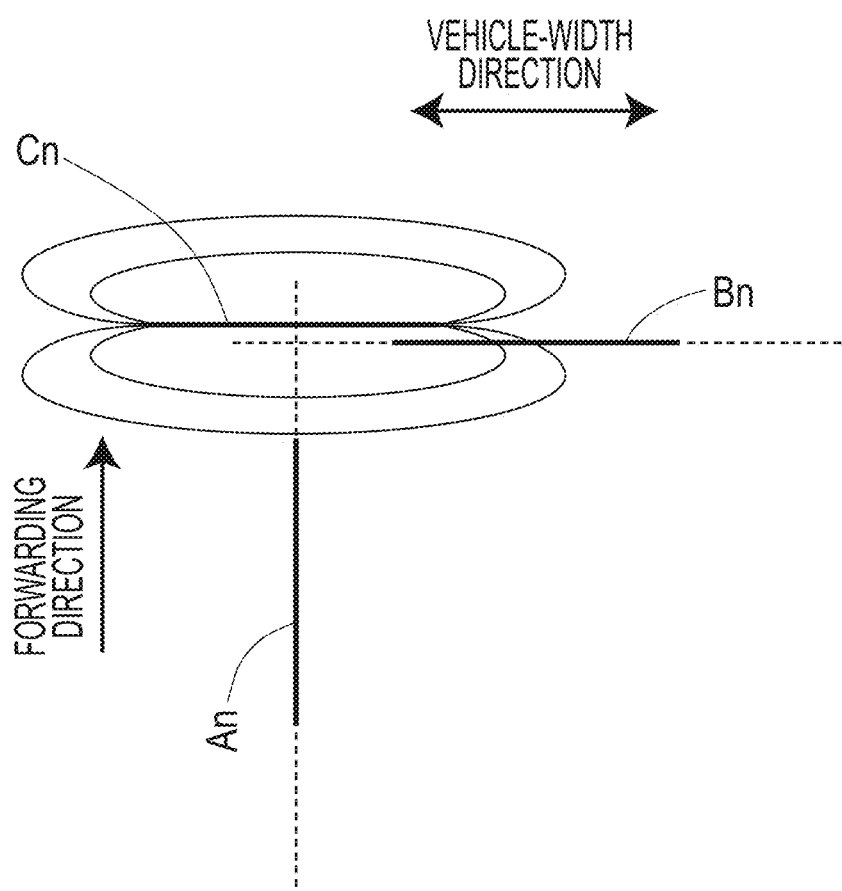
FIG. 16 is a descriptive diagram of another positional relation between the magnetic sensor and the magnetic field generation coil in the second embodiment.

The present embodiment is an example in which, based on sensor block Sn of the first embodiment, the arrangement of magnetic field generation coil Cn with respect to magnetic sensors An and Bn is changed. With reference to FIG. 14 to FIG. 16, the arrangement of magnetic field generation coil Cn is described. In FIG. 14 to FIG. 16, as with FIG. 5 in the first embodiment, magnetic sensors An and Bn are represented by line segments each schematically depicting the magneto-sensitive body, and magnetic field generation coil Cn is represented by a line segment representing the center axis. The center axis is an axis along the tube direction of magnetic field generation coil Cn exhibiting the tubular shape.

FIG. 14 depicts an example in which magnetic field generation coil Cn is disposed outside an area between the detection axes (center axes of magneto-sensitive bodies) of magnetic sensors An and Bn. Furthermore, magnetic field generation coil Cn in the drawing may be shifted along its tube direction. It is only required that magnetic field generation coil Cn can generate a magnetic component along the detecting direction of magnetic sensor An and a magnetic component along the detecting direction of magnetic sensor Bn.

FIG. 15 depicts an example in which magnetic field generation coil Cn is disposed so as to be along the detecting direction of magnetic sensor Bn. Magnetic field generation coil Cn is positioned so that the tube direction is orthogonal to the detecting direction of magnetic sensor An and the center in the tube direction is shifted along the tube direction with respect to magnetic sensor An (with reference to the axis line of the detecting axis of magnetic sensor An). As exemplarily depicted in the drawing, while the magnetic lines of force representing the magnetic field of magnetic field generation coil Cn are nearly parallel with respect to the tube direction at an intermediate portion of magnetic field generation coil Cn, the magnetic lines of force are oblique as wrapping around at end portions of the magnetic field generation coil Cn. And, the magnetic lines of force in an oblique direction include magnetic components orthogonal to the tube direction of magnetic field generation coil Cn. In the configuration of the drawing, the magnetic components orthogonal to the tube direction of magnetic field generation coil Cn act on magnetic sensor An.

FIG. 16 is a diagram for describing the arrangement of magnetic field generation coil Cn not included in the technical idea of the present invention. In FIG. 16, the tube direction of magnetic field generation coil Cn is orthogonal to the detecting direction of magnetic sensor An, and the center of magnetic field generation coil Cn in the tube direction is positioned on the axis line of the detection axis of magnetic sensor An. When the center of magnetic field generation coil Cn in the tube direction is positioned on the axis line of the detection axis of magnetic sensor An as described above, the magnetic components orthogonal to the tube direction of magnetic field generation coil Cn do not act on magnetic sensor An. Therefore, the arrangement as in FIG. 16 is not included in the technical idea of the present invention.

On the other hand, with reference to the arrangement of FIG. 16, an arrangement in which magnetic field generation coil Cn is shifted along the tube direction, an arrangement in which the tube direction of magnetic field generation coil Cn is rotated so as not to be orthogonal to the detecting direction of magnetic sensor An, and so forth are included in the technical idea of the present invention.

Note that the other configurations and the operation and effects are similar to those in the first embodiment.

Third Embodiment

The present embodiment is an example in which the configuration of the magnetic sensors is changed based on sensor block Sn of the in the first embodiment. Details of this are described with reference to FIG. 17 and FIG. 18. In these drawings, the detecting directions of the respective magnetic sensors are represented as an x axis, a y axis, and a z axis, and the center axis of magnetic field generation coil Cn is represented as a line segment.

Figure 17:
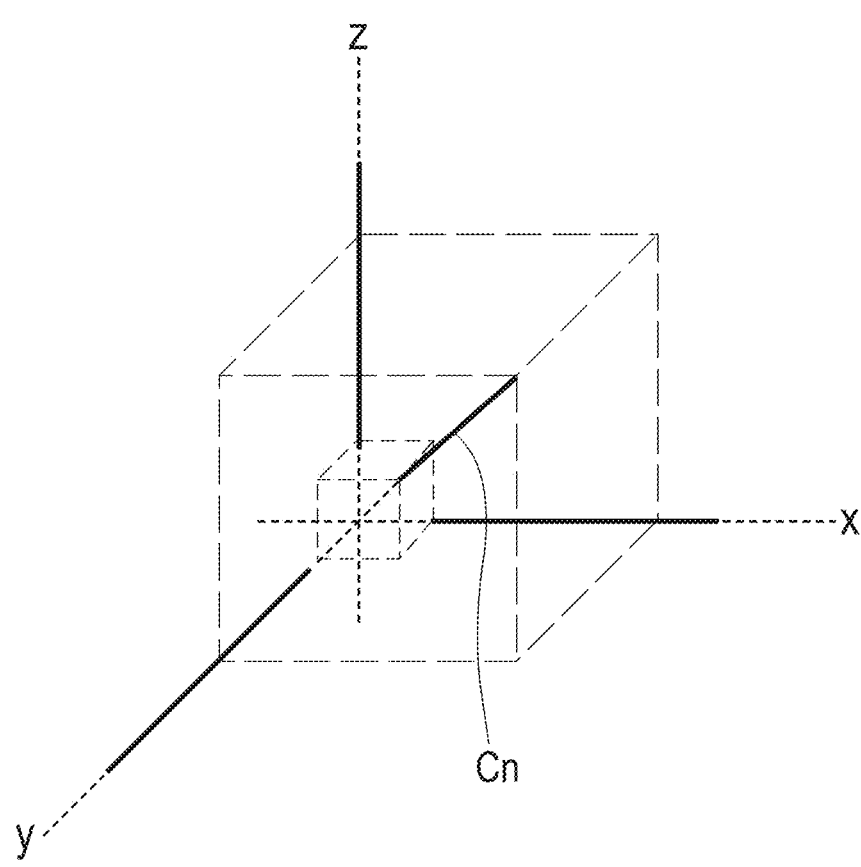
FIG. 17 is a descriptive diagram of another positional relation between the magnetic sensor and the magnetic field generation coil in a third embodiment.

In the sensor block Sn of the present embodiment, as in FIG. 17, three magnetic sensors are incorporated so that the detecting directions are along three directions orthogonal to one another (axial directions of the x axis, the y axis, and the z axis). And, magnetic field generation coil Cn is disposed so as to be oblique to form 45 degrees with respect to all of the three magnetic sensors. According to magnetic field generation coil Cn in the drawing, it is possible to simultaneously act on three magnetic sensors orthogonal to one another with magnetism.

Figure 18:
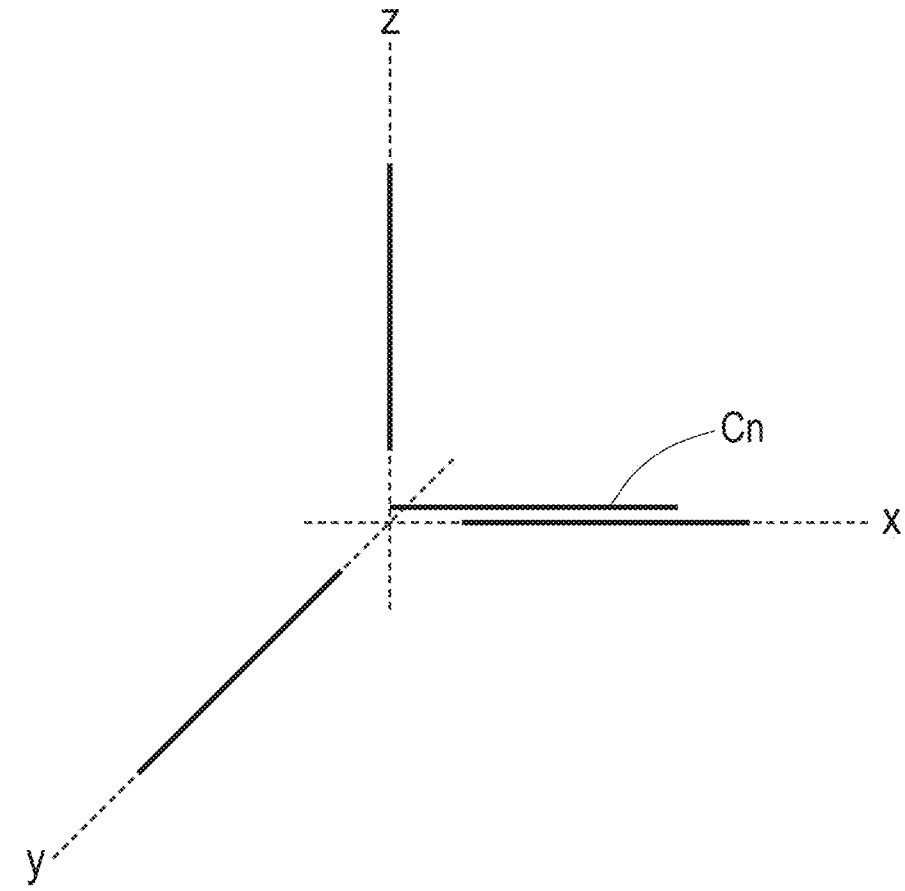
FIG. 18 is a descriptive diagram of another positional relation between the magnetic sensor and the magnetic field generation coil in the third embodiment.

In FIG. 18, based on the configuration of FIG. 17, the arrangement specification of magnetic field generation coil Cn is changed. In the configuration of FIG. 18, magnetic field generation coil Cn is parallel to the x axis along the detecting direction of any one magnetic sensor. However, with reference to the y axis and the z axis along the detecting directions of the other two magnetic sensors, the center of magnetic field generation coil Cn in the tube direction is positioned as shifted along the tube direction.

Note that the other configurations and the operation and effects are similar to those in the first embodiment or the second embodiment.

In the foregoing, while specific examples of the present invention are described in detail as in the embodiments, these specific examples merely disclose examples of technology included in the scope of the claims. Needless to say, the scope of the claims should not be restrictively construed based on the configuration, numerical values, and so forth of the specific examples. The scope of the claims includes techniques acquired by variously modifying, changing, or combining as appropriate the above-described specific examples by using known techniques, knowledge of a person skilled in the art, and so forth.

REFERENCE SIGNS LIST 1 marker detection device (magnetism measurement device)
10 magnetic marker
11 sensor array
110 calibration circuit
112 calibrating circuit (storage part, estimating part, calibrating part)
12 detecting unit
125 filter processing circuit
127 detection processing circuit
2 sensor block
20 amorphous wire (magnetic wire)
21 pickup coil (coil)
Sn sensor block
An, Bn magnetic sensor
Cn magnetic field generation coil (magnetic field generating part, coil)
5 vehicle
6 magnetic field generation device
60 Helmholtz coil

The invention claimed is:

1. A sensor block for magnetism measurement, the sensor block comprising:
   a first magnetic sensor that detects magnetism acting along a first direction;
   a second magnetic sensor that detects magnetism acting along a second direction crossing the first direction in which the first magnetic sensor detects magnetism; and
   a magnetic field generator that includes a tubular coil with an electric wire wound therearound and causes a magnetic field to be generated in response to energization,
   wherein the magnetic field generator is incorporated in a state in which positions and angles relative to the first magnetic sensor and the second magnetic sensor are fixed, so as to be integrated with respect to the first magnetic sensor and the second magnetic sensor,
   wherein the magnetic field generator is configured to act with the magnetism along the first direction and the second direction in response to the energization,
   wherein the magnetic field generator forms a position relation in which a tube direction of the tubular coil crosses the first direction,
   wherein the magnetic field generator forms a position relation in which the tube direction crosses the second direction, and
   wherein the first direction and the second direction are orthogonal to each other, and the tube direction crosses each of the first direction and the second direction at an equal angle.

2. The sensor block for magnetism measurement in claim 1, wherein the sensor block has a plurality of combinations of magnetic sensors formed of the first magnetic sensor and the second magnetic sensor, and the magnetic field generator is provided for each of the plurality of combinations of magnetic sensors.

3. The sensor block for magnetism measurement in claim 2, wherein the tubular coil of the magnetic field generator provided for each of the plurality of combinations of magnetic sensors is connected to form an electrical series.

4. The sensor block for magnetism measurement in claim 3, comprising:
   a memory that stores, for at least any of the magnetic sensors, a first magnetic measurement value when a predetermined current is passed to the magnetic field generator for the energization under a state in which magnetism acting from outside is managed and a second magnetic measurement value when the magnetic field generator is in non-energization under the state in which the magnetism acting from the outside is managed; and circuitry configured to calculate, for the at least any of magnetic sensors, an estimated value, which is a magnetic measurement value predicted when a predetermined current is passed to the magnetic field generator for the energization, based on the first magnetic measurement value and the second magnetic measurement value stored in the memory, and calibrate, for the at least any of magnetic sensors, the sensor block so that a ratio between an actual magnetic measurement value and the estimated value is adjusted as a predetermined value when the predetermined current is passed to the magnetic field generator for the energization.

5. The sensor block for magnetism measurement in claim 2, comprising:

a memory that stores, for at least any of the magnetic sensors, a first magnetic measurement value when a predetermined current is passed to the magnetic field generator for the energization under a state in which magnetism acting from outside is managed and a second magnetic measurement value when the magnetic field generator is in non-energization under the state in which the magnetism acting from the outside is managed; and circuitry configured to calculate, for the at least any of magnetic sensors, an estimated value, which is a magnetic measurement value predicted when a predetermined current is passed to the magnetic field generator for the energization, based on the first magnetic measurement value and the second magnetic measurement value stored in the memory, and calibrate, for the at least any of magnetic sensors, the sensor block so that a ratio between an actual magnetic measurement value and the estimated value is adjusted as a predetermined value when the predetermined current is passed to the magnetic field generator for the energization.

6. The sensor block for magnetism measurement in claim 1, comprising:

a memory that stores, for at least any of the magnetic sensors, a first magnetic measurement value when a predetermined current is passed to the magnetic field generator for the energization under a state in which magnetism acting from outside is managed and a second magnetic measurement value when the magnetic field generator is in non-energization under the state in which the magnetism acting from the outside is managed; and circuitry configured to calculate, for the at least any of magnetic sensors, an estimated value, which is a magnetic measurement value predicted when a predetermined current is passed to the magnetic field generator for the energization, based on the first magnetic measurement value and the second magnetic measurement value stored in the memory, and calibrate, for the at least any of magnetic sensors, the sensor block so that a ratio between an actual magnetic measurement value and the estimated value is adjusted as a predetermined value when the predetermined current is passed to the magnetic field generator for the energization.

7. The sensor block for magnetism measurement in claim 1, wherein the magnetic field generator forms any position relation among a position relation in which the tube direction of the tubular coil crosses the first direction, a position relation in which the tube direction is parallel to the first direction, and a position relation in which the tube direction is orthogonal to the first direction and a center point of the tubular coil in the tube direction is positioned as shifted to the tube direction with respect to the first magnetic sensor, and forms any position relation among a position relation in which the tube direction crosses the second direction, a position relation in which the tube direction is parallel to the second direction, and a position relation in which the tube direction is orthogonal to the second direction and the center point of the tubular coil in the tube direction is positioned as shifted to the tube direction with respect to the second magnetic sensor, and the tubular coil has the tube direction orthogonal to at least any one direction of the first direction and the second direction, and the center point of the tubular coil in the tube direction is positioned as shifted to the tube direction with respect to at least one of the first magnetic sensor and the second magnetic sensor that detects magnetism along the at least any one direction.

8. The sensor block for magnetism measurement in claim 7, wherein the tubular coil has the tube direction orthogonal to both of the first direction and the second direction, and the center point of the tubular coil in the tube direction is positioned as shifted to the tube direction with respect to both of the first magnetic sensor and the second magnetic sensor.

9. The sensor block for magnetism measurement in claim 1, wherein the sensor block has a third magnetic sensor that detects magnetism acting along a third direction crossing the first direction and the second direction, and the magnetic field generator forms any position relation among a position relation in which the tube direction crosses the third direction, a position relation in which the tube direction is parallel to the third direction, and a position relation in which the tube direction is orthogonal to the third direction and a center point of the tubular coil in the tube direction is positioned as shifted to the tube direction with respect to the third magnetic sensor.

10. A sensor block for magnetism measurement, the sensor block comprising:

a first magnetic sensor that detects magnetism acting along a first direction;

a second magnetic sensor that detects magnetism acting along a second direction crossing the first direction in which the first magnetic sensor detects magnetism; and a magnetic field generator that includes a tubular coil with an electric wire wound therearound and causes a magnetic field to be generated in response to energization, wherein the magnetic field generator is incorporated in a state in which positions and angles relative to the first magnetic sensor and the second magnetic sensor are fixed, so as to be integrated with respect to the first magnetic sensor and the second magnetic sensor, wherein the magnetic field generator is configured to act with the magnetism along the first direction and the second direction in response to the energization, wherein the magnetic field generator forms any position relation among:

a first position relation in which a tube direction of the tubular coil crosses the first direction, and the tube direction crosses the second direction, a second position relation in which the tube direction is parallel to the first direction, and the tube direction is orthogonal to the second direction and a center point of the tubular coil in the tube direction is positioned as shifted to the tube direction with respect to the second magnetic sensor, and a third position relation in which the tube direction is orthogonal to the first direction and the center point of the tubular coil in the tube direction is positioned as shifted to the tube direction with respect to the first magnetic sensor, and the tube direction is parallel to the second direction.

11. The sensor block for magnetism measurement in claim 10, wherein the sensor block has a third magnetic sensor that detects magnetism acting along a third direction crossing the first direction and the second direction, and the magnetic field generator forms any position relation among a position relation in which the tube direction crosses the third direction, a position relation in which the tube direction is parallel to the third direction, and a position relation in which the tube direction is orthogonal to the third direction and the center point of the tubular coil in the tube direction is positioned as shifted to the tube direction with respect to the third magnetic sensor.

12. The sensor block for magnetism measurement in claim 11, wherein the sensor block has a plurality of combinations of magnetic sensors formed of the first magnetic sensor, the second magnetic sensor, and the third magnetic sensor, and the magnetic field generator is provided for each of the plurality of combinations of magnetic sensors.

13. The sensor block for magnetism measurement in claim 12, wherein the tubular coil of the magnetic field generator provided for each of the plurality of combinations of magnetic sensors is connected to form an electrical series.

14. The sensor block for magnetism measurement in claim 12, comprising:

a memory that stores, for at least any of the magnetic sensors, a first magnetic measurement value when a predetermined current is passed to the magnetic field generator for the energization under a state in which magnetism acting from outside is managed and a second magnetic measurement value when the magnetic field generator is in non-energization under the state in which the magnetism acting from the outside is managed; and circuitry configured to calculate, for the at least any of magnetic sensors, an estimated value, which is a magnetic measurement value predicted when a predetermined current is passed to the magnetic field generator for the energization, based on the first magnetic measurement value and the second magnetic measurement value stored in the memory, and calibrate, for the at least any of magnetic sensors, the sensor block so that a ratio between an actual magnetic measurement value and the estimated value is adjusted as a predetermined value when the predetermined current is passed to the magnetic field generator for the energization.

15. The sensor block for magnetism measurement in claim 10, wherein the sensor block has a plurality of combinations of magnetic sensors formed of the first magnetic sensor and the second magnetic sensor, and the magnetic field generator is provided for each of the plurality of combinations of magnetic sensors.

16. The sensor block for magnetism measurement in claim 10, comprising:

a memory that stores, for at least any of the magnetic sensors, a first magnetic measurement value when a predetermined current is passed to the magnetic field generator for the energization under a state in which magnetism acting from outside is managed and a second magnetic measurement value when the magnetic field generator is in non-energization under the state in which the magnetism acting from the outside is managed; and circuitry configured to calculate, for the at least any of magnetic sensors, an estimated value, which is a magnetic measurement value predicted when a predetermined current is passed to the magnetic field generator for the energization, based on the first magnetic measurement value and the second magnetic measurement value stored in the memory, and calibrate, for the at least any of magnetic sensors, the sensor block so that a ratio between an actual magnetic measurement value and the estimated value is adjusted as a predetermined value when the predetermined current is passed to the magnetic field generator for the energization.

17. A sensor block for magnetism measurement, the sensor block comprising:

a first magnetic sensor that detects magnetism acting along a first direction;

a second magnetic sensor that detects magnetism acting along a second direction crossing the first direction in which the first magnetic sensor detects magnetism;

a third magnetic sensor that detects magnetism acting along a third direction crossing the first direction and the second direction; and a magnetic field generator that includes a tubular coil with an electric wire wound therearound and causes a magnetic field to be generated in response to energization, wherein the magnetic field generator is incorporated in a state in which positions and angles relative to the first magnetic sensor, the second magnetic sensor and the third magnetic sensor are fixed, so as to be integrated with respect to the first magnetic sensor, the second magnetic sensor, and the third magnetic sensor, wherein the magnetic field generator is configured to act with the magnetism along the first direction, the second direction and the third direction in response to the energization, wherein any two directions of the first direction, the second direction, and the third direction are orthogonal to each other, and wherein the magnetic field generator forms a position relation in which a tube direction of the tubular coil crosses each direction of the first direction, the second direction, and the third direction at an equal angle.

18. The sensor block for magnetism measurement in claim 17, wherein the sensor block has a plurality of combinations of magnetic sensors formed of the first magnetic sensor, the second magnetic sensor, and the third magnetic sensor, and the magnetic field generator is provided for each of the plurality of combinations of magnetic sensors.

* * * * *